(12) United States Patent
Kobayashi et al.

(10) Patent No.: US 10,875,487 B2
(45) Date of Patent: Dec. 29, 2020

(54) SIDE AIRBAG DEVICE

(71) Applicant: AUTOLIV DEVELOPMENT AB, Vargarda (SE)

(72) Inventors: Yuto Kobayashi, Yokohama (JP); Mitsuo Nogami, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 44 days.

(21) Appl. No.: 16/257,362

(22) Filed: Jan. 25, 2019

(65) Prior Publication Data
US 2019/0232914 A1 Aug. 1, 2019

(30) Foreign Application Priority Data

Jan. 26, 2018 (JP) ................ 2018-011253
Dec. 6, 2018 (JP) ................ 2018-228780

(51) Int. Cl.
*B60R 21/231* (2011.01)
*B60R 21/207* (2006.01)
*B60R 21/233* (2006.01)

(52) U.S. Cl.
CPC ...... *B60R 21/23138* (2013.01); *B60R 21/207* (2013.01); *B60R 21/233* (2013.01); *B60R 2021/23107* (2013.01); *B60R 2021/23146* (2013.01); *B60R 2021/23324* (2013.01)

(58) Field of Classification Search
CPC ............ B60R 21/23138; B60R 21/233; B60R 21/207; B60R 2021/23107; B60R 2021/23146; B60R 2021/23324; B60R 21/21
See application file for complete search history.

(56) References Cited

U.S. PATENT DOCUMENTS

| | | | |
|---|---|---|---|
| 7,597,348 B2 | 10/2009 | Fukuda et al. | |
| 7,806,433 B2 | 10/2010 | Mitsuo et al. | |
| 7,832,760 B2 | 11/2010 | Mitsuo et al. | |
| 9,505,375 B2 | 11/2016 | Kobayashi et al. | |
| 9,598,043 B2 | 3/2017 | Kobayashi et al. | |

(Continued)

FOREIGN PATENT DOCUMENTS

WO    WO-2017209192 A1    12/2017

OTHER PUBLICATIONS

European Search Report for corresponding EP application 19 15 2766 completed on Apr. 4, 2019.

*Primary Examiner* — Drew J Brown
(74) *Attorney, Agent, or Firm* — Stephen T. Olson; Harness, Dickey & Pierce, P.L.C.

(57) ABSTRACT

A side airbag device stored in a side support of a vehicle seat includes an airbag module having an airbag with first and second chambers and an inflator and a webbing partially covering the airbag module. The first chamber is deployed toward a front side of the side support and the second chamber accommodates the inflator therein and is deployed at an inner side with respect to the first chamber. The webbing extends from a rear side of the airbag module along an inner side surface of the airbag module, passes through a pad of the side support along a first path so as to reach an outside of the side support, and further extend along an outer surface of the side support and reach proximately a front edge of the side support when viewed in horizontal cross section of the airbag module from above.

17 Claims, 30 Drawing Sheets

A1-A1 Cross Section

(56) References Cited

U.S. PATENT DOCUMENTS

| | | |
|---|---|---|
| 9,783,149 B2 | 10/2017 | Taguchi et al. |
| 9,975,519 B2 | 5/2018 | Kobayashi |
| 10,246,041 B2 | 4/2019 | Kobayashi et al. |
| 10,351,092 B2 | 7/2019 | Taguchi et al. |
| 2008/0238057 A1* | 10/2008 | Inoue ................ B60R 21/01538 280/735 |
| 2009/0020988 A1* | 1/2009 | Sato .................. B60R 21/23138 280/730.2 |
| 2013/0175792 A1* | 7/2013 | Fukawatase ........... B60N 2/289 280/728.2 |
| 2015/0076802 A1* | 3/2015 | Tanabe ................ B60R 21/207 280/730.2 |
| 2015/0115583 A1* | 4/2015 | Azuma ................ B60R 21/233 280/740 |
| 2016/0114751 A1* | 4/2016 | Saito ........................ B60N 2/42 297/216.13 |
| 2017/0174174 A1* | 6/2017 | Ohno .................... B60R 21/235 |
| 2017/0182962 A1* | 6/2017 | Hiraiwa ................ B60R 21/207 |
| 2017/0369020 A1* | 12/2017 | Hiraiwa .................... B60N 2/99 |
| 2018/0186326 A1* | 7/2018 | Kobayashi ............ B60R 21/239 |
| 2019/0023217 A1* | 1/2019 | Ohno .................... B60R 21/233 |
| 2019/0084516 A1* | 3/2019 | Fukawatase .......... B60R 21/207 |
| 2019/0135219 A1* | 5/2019 | Kobayashi ............... B60N 2/42 |

* cited by examiner

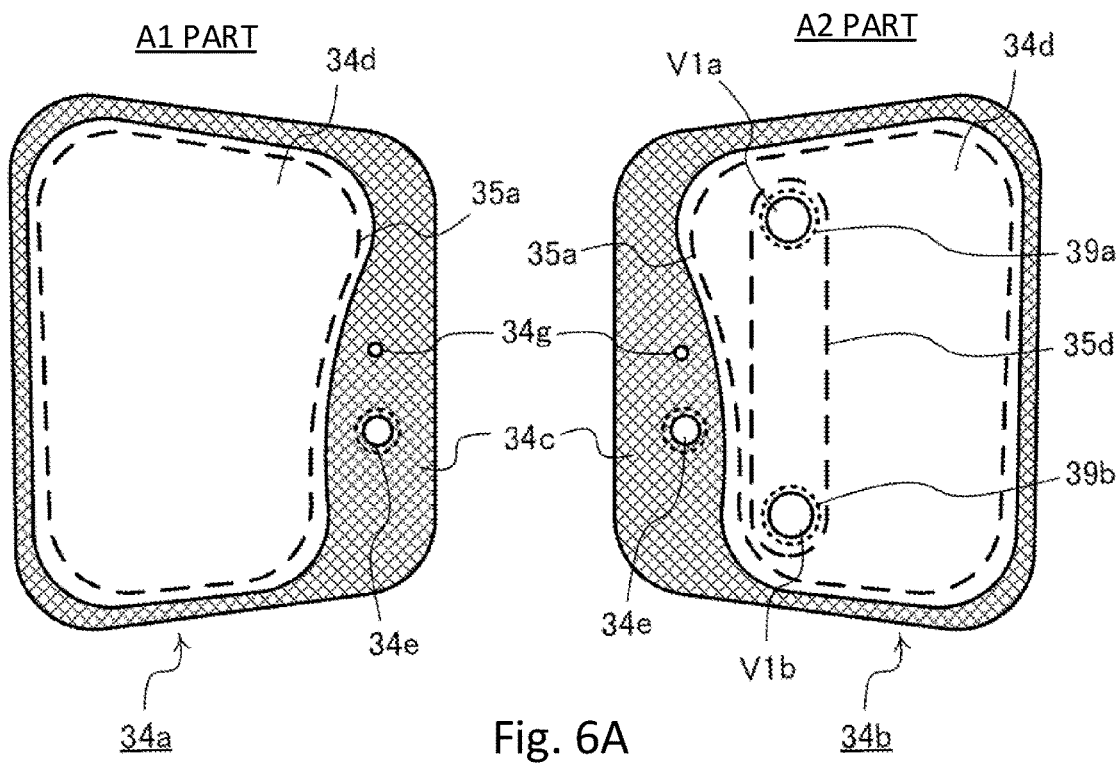
Fig. 6A
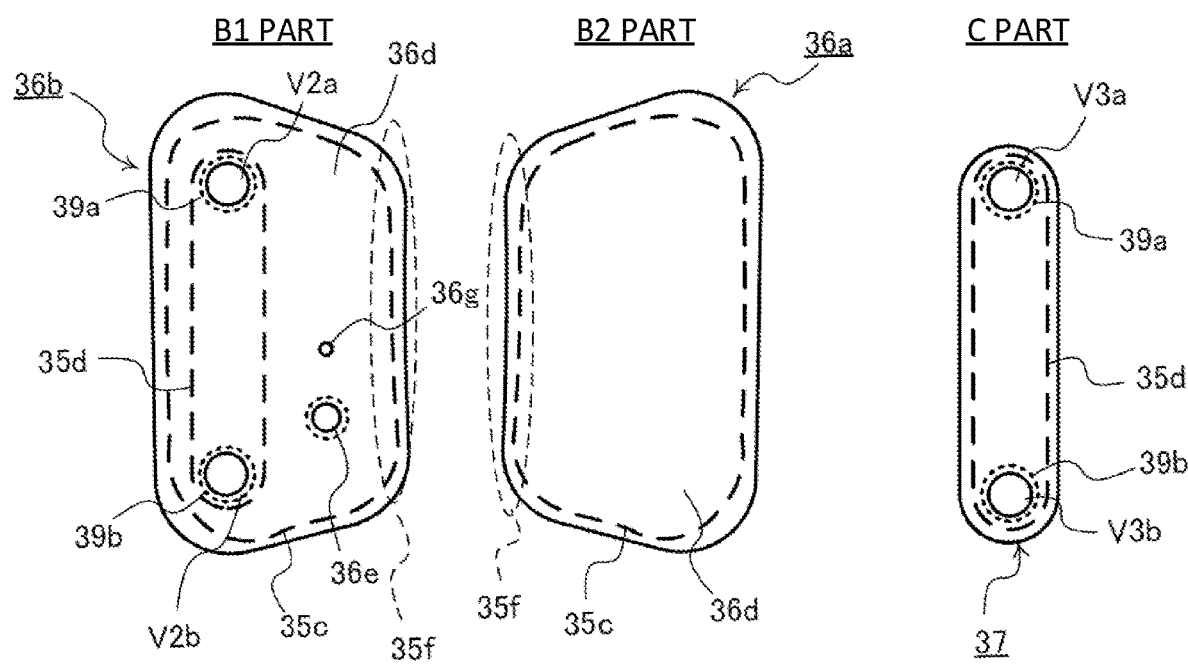
Fig. 6B
Fig. 6C

A1-A1 Cross Section

OUTSIDE

INSIDE (OCCUPANT SIDE)

A1-A1 Cross Section

A1-A1 Cross Section

A1-A1 Cross Section

A1-A1 Cross Section

A1-A1 Cross Section

A1-A1 Cross Section

A1-A1 Cross Section

A1-A1 Cross Section

A1-A1 Cross Section

A1-A1 Cross Section

A1-A1 Cross Section

A1-A1 Cross Section

A1-A1 Cross Section

A1-A1 Cross Section

A1-A1 Cross Section

A1-A1 Cross Section

A1-A1 Cross Section

A1-A1 Cross Section

A1-A1 Cross Section

A1-A1 Cross Section

SIDE AIRBAG DEVICE

CROSS-REFERENCE TO RELATED APPLICATION

This application claims priority to Japanese Patent Applications No. 2018-011253 filed 26 Jan. 2018 and No. 2018-228780 filed 6 Dec. 2018 which are hereby expressly incorporated by reference herein in their entirety.

BACKGROUND

Technical Field

The present invention relates to a side airbag device that is equipped within a vehicle seat.

Background Art

It is well known that one or a plurality of airbags is provided in a motor vehicle in order to protect an occupant when a vehicle accident occurs. There are various types of airbags, for instance, a so-called airbag for a driver, a curtain airbag, and a side airbag. Specifically, the airbag for a driver protects the driver by being expanded proximately from a center of a steering wheel of a vehicle. The curtain airbag protects an occupant by being downwardly deployed an inward side of a window of a vehicle against the impact in a lateral direction of the vehicle, an overturn accident, or a rollover accident. Further, the side airbag is deployed between the occupant and a side panel in order to protect the occupant at the time of the impact in a lateral direction of the vehicle. The present invention relates to a side airbag device being provided within a vehicle seat.

A side airbag device described in Japanese Patent Publication Number 2009-023494 is provided with a primary airbag and an auxiliary airbag. Further, because the auxiliary airbag is expanded and deployed prior to the expansion and deployment of the primary airbag, an occupant is restrained at an early stage. In addition to the invention described in Japanese Patent Publication Number 2009-023494, a side airbag device that is provided with an auxiliary airbag in addition to a primary airbag has been proposed. In regards to the side airbag device explained above, because an installation region is largely restricted, the compactification of the device is strongly requested. Further, an improvement of a deployment speed and proper occupant protection performance based on the stabilization of the deployment behavior and deployment shape are required.

SUMMARY

The present invention attempts to solve the above problems. An object of the present invention is to provide a side airbag device that can promptly and properly restrain an occupant. Further, another object of the present invention is to provide the side airbag device that contributes to the compactification of the device.

In order to achieve the above object, a side airbag according to one aspect of the present invention is stored in a side support of a vehicle seat. A side frame is disposed in the side support. The side frame has a frame sidewall extending along a vehicle travel direction. The side airbag includes: an airbag module, the airbag module having an airbag restraining an occupant when the airbag is expanded and deployed, the airbag having a first chamber, a second chamber, and an inner vent hole at a partition between the first and second chambers, and an inflator supplying an inflation gas to the airbag, the inflator being disposed at an inner side of the frame sidewall in a vehicle width direction; and a webbing (a stay cloth) partially covering the airbag module when the airbag module is stored. The first chamber is configured to be deployed toward a front side of the side support in the vehicle travel direction, and the second chamber accommodates the inflator therein and is configured to be deployed at an inner side with respect to the first chamber in the vehicle width direction. The inflation gas flows from the second chamber to the first chamber through the inner vent hole. The webbing is disposed to extend from a rear side of the airbag module in the vehicle travel direction along an inner side surface of the airbag module, pass through a pad of the side support along a first path so as to reach an outside of the side support, and further extend along an outer surface of the side support and reach proximately a front edge of the side support in the vehicle travel direction when viewed in horizontal cross section of the airbag module from above.

In the above configuration according to one aspect of the present invention, because the second chamber is deployed inside the side support in an initial stage of the operation of the airbag device, it becomes possible that the occupant is promptly restrained so as to prevent the occupant from further moving toward an outer side in a vehicle width direction.

Further, according to one aspect of the present invention, the webbing (stay cloth) that covers the airbag module is provided so as to extend from the rear side of the airbag module along the inner surface, reach the outside of the side support by passing through the pad that forms the side support, and finally reach proximately the front edge of the side support along the outer surface of the side support. As a result, the deployment behavior of the second chamber that is deployed prior to the deployment of the first chamber can be optimized.

More specifically, an unfavorable situation, in which the second chamber is deployed toward an inner side in the vehicle width direction so as to enter the rear of the pad and go around the back side of the occupant in the initial stage of the deployment of the airbag, can be avoided. That is, the deployment direction of the second chamber is guided toward the vehicle front side by the regulation of the webbing. If the second chamber goes around the back side of the occupant, a force for pushing the occupant from the back toward a slanting front side is generated. As a result, the occupant moves toward the direction in which the seat belt is pulled out. However, by adopting the webbing according to one aspect of the present invention, the second chamber is not expanded toward the occupant side more than necessary and is certainly deployed toward the vehicle front side.

A side airbag according to another aspect of the present invention is stored in a side support of a vehicle seat. A side frame and a pad are disposed in the side support. The side frame has a frame sidewall extending along a vehicle travel direction. The pad covers at least a front side of the side frame in the vehicle traveling direction. The side airbag includes: an airbag module, the airbag module having an airbag restraining an occupant when the airbag is expanded and deployed, and an inflator supplying an inflation gas to the airbag, the inflator being disposed at an occupant seating side of the frame sidewall in a vehicle width direction; and a webbing partially covering the airbag module when the airbag module is stored. The webbing is disposed to extend from a rear side of the airbag module toward a vehicle front side along an inner side surface of the pad, pass through the pad along a first path so as to reach an outside of the pad, and further extend along an outer surface of the pad and reach proximately a front edge of the side support in the vehicle travel direction when viewed in horizontal cross section of the airbag module from above.

In the above configuration according to another aspect of the present invention, the airbag can have a first chamber and a second chamber. The first chamber is configured to be deployed toward a front side of the side support in the vehicle travel direction. Further, the second chamber accommodates the inflator therein and is configured to be deployed at the occupant seating side with respect to the first chamber in the vehicle width direction. In addition, it is preferred that the airbag has an inner vent hole at a partition between the first and second chamber. The inflation gas flows from the second chamber to the first chamber through the inner vent hole.

With respect to the above aspects according to the present invention, the first path can be disposed from the rear side of the airbag module toward an outside of the pad so that the webbing is bent. The first path can be disposed in a direction perpendicular to an outer surface of the pad.

With respect to the above aspects according to the present invention, the first path can be disposed to linearly extend from the rear side of the airbag module toward an outside of the pad.

With respect to the above aspects according to the present invention, the first path can be disposed at a cleavage part of the pad from which the pad is torn and/or open (is cleaved) when the airbag is deployed.

With respect to the above aspects according to the present invention, the webbing can be disposed to extend proximately from the front edge of the side support along an outer surface of the pad that is opposite to an occupant seating side of the side support in the vehicle width direction, pass through a second path that is formed from the outer surface of the pad toward an inside of the side support, and reach a rear side of the airbag module in the vehicle travel direction. That is, because the webbing surrounds the airbag module along with the pad of the side support, it becomes possible that the deployment behavior of the airbag is controlled more certainly.

With respect to the above aspects according to the present invention, the webbing can be disposed to extend proximately from the front edge of the side support along an outer surface of the pad that is opposite to an occupant seating side of the side support in the vehicle width direction and connect with an outer side of the pad.

With respect to the above aspects according to the present invention, the webbing can be a band-shaped (belt-shaped) cloth. Further, the webbing can be ring-shaped as a circular structure in a horizontal plane.

With respect to the above aspects according to the present invention, further, the webbing can have a fragile part that is a starting point to cleave (tear and open) when the airbag is deployed. As a result, the situation in which the side support is prevented from performing the cleavage operation at the time of the deployment of the airbag can be avoided. Further, the fragile part of the webbing can be a seam of the sewing. In addition, because the webbing cleaves, the first chamber is expanded instantaneously from the part of the cleavage (fragile part) of the webbing and it becomes possible that the first chamber is promptly deployed outward the side support.

With respect to the above aspects according to the present invention, a rear end of the webbing can be fixed to the side frame by using such as a bolt. As explained above, because the end of the webbing is connected to the fixing part of such as the side frame, the deployment regulation of the airbag becomes more certain by using the webbing.

With respect to the above aspects according to the present invention, the webbing can be the band-shaped cloth and be provided at each of upper and lower locations of the airbag module. Specifically, the webbing can be configured with first and second webbings. Each of the first and second webbings is the band-shaped cloth. Further, the first and second webbings are disposed at the upper and lower locations at the airbag module in a vertical direction.

With respect to the above aspects according to the present invention, the first and second paths can be slits being formed in the pad.

With respect to the above aspects according to the present invention, the second chamber is configured to be deployed by overlapping the frame sidewall when viewed in the vehicle width direction and the first chamber is configured to be deployed without overlapping the frame sidewall when viewed in the vehicle width direction. In this case, the second chamber is securely deployed toward a center side of the seat while the frame sidewall receives the reaction force at the time of the deployment of the second chamber. Even after the completion of the deployment, the frame sidewall receives the pressure from the occupant. As a result, it becomes possible to securely restrain the occupant with respect to and toward the center side of the seat. On the other hand, the first chamber can be promptly and smoothly deployed without the deployment obstruction by the side frame (including the frame sidewall) and the second chamber.

With respect to the above aspects according to the present invention, the airbag module can be provided so as to extend on an extension line of the frame sidewall when the airbag module is stored. The extension line extends toward the vehicle front side from the front side of the frame sidewall.

The side airbag according to the above aspects of the present invention can also be applicable to a configuration in which a side airbag is deployed toward the vehicle center side of the seat in addition to a configuration in which a side airbag is deployed toward the door side (outward side) of the seat. Further, the side airbag that is deployed toward the vehicle center side of the seat is referred to, for instance, as a far side airbag, a front center airbag, or a rear center airbag.

BRIEF DESCRIPTION OF THE DRAWINGS

FIGS. 6A-6C are plan views that show component parts of the side airbag device according to an embodiment of the present invention.

FIG. 7 corresponds to a part of a cross section along the A1-A1 direction shown in FIG. 3.

FIG. 8B corresponds to the schematic side view when observed from an inner side in the vehicle width direction.

FIG. 9A shows a state of an initial stage of the deployment. FIG. 9B shows a state of a latter stage of the deployment.

FIG. 11 corresponds to a part of a cross section along the A1-A1 direction shown in FIG. 3.

FIG. 12 corresponds to a part of a cross section along the A1-A1 direction shown in FIG. 3.

FIG. 13 corresponds to a part of a cross section along the A1-A1 direction shown in FIG. 3.

FIG. 14 corresponds to a part of a cross section along the A1-A1 direction shown in FIG. 3.

FIG. 15 corresponds to a part of a cross section along the A1-A1 direction shown in FIG. 3.

FIG. 16 corresponds to a part of a cross section along the A1-A1 direction shown in FIG. 3.

FIG. 17 corresponds to a part of a cross section along the A1-A1 direction shown in FIG. 3.

FIG. 18 corresponds to a part of a cross section along the A1-A1 direction shown in FIG. 3.

FIG. 19 corresponds to a part of a cross section along the A1-A1 direction shown in FIG. 3.

FIG. 20 corresponds to a part of a cross section along the A1-A1 direction shown in FIG. 3.

FIG. 21 corresponds to a part of a cross section along the A1-A1 direction shown in FIG. 3.

FIG. 22 corresponds to a part of a cross section along the A1-A1 direction shown in FIG. 3.

FIG. 23 corresponds to a part of a cross section along the A1-A1 direction shown in FIG. 3.

FIG. 24 corresponds to a part of a cross section along the A1-A1 direction shown in FIG. 3.

FIG. 25 corresponds to a part of a cross section along the A1-A1 direction shown in FIG. 3.

FIG. 26 corresponds to a part of a cross section along the A1-A1 direction shown in FIG. 3.

FIG. 27 corresponds to a part of a cross section along the A1-A1 direction shown in FIG. 3.

FIG. 28 corresponds to a part of a cross section along the A1-A1 direction shown in FIG. 3.

FIG. 29 corresponds to a part of a cross section along the A1-A1 direction shown in FIG. 3.

FIG. 30 corresponds to a part of a cross section along the A1-A1 direction shown in FIG. 3.

DESCRIPTION OF EXEMPLARY EMBODIMENTS

A side airbag device according to embodiments of the present invention will be explained in detail with reference to the drawings below. Note that in each drawing, a front of a vehicle (a vehicle front side) (in an advancing direction/a vehicle travel direction) denotes "front," a rear of a vehicle (a vehicle rear side) (an opposite side of the advancing direction/the vehicle travel direction) denotes "rear," an inside (inner side)(with respect to a side support) in a vehicle width direction (an occupant side) denotes "inside" (inner or inward side), and an outside (outer side)(with respect to the side support) in the vehicle width direction (a door panel side) denotes "outside" (outer or outward side).

Figure 1:
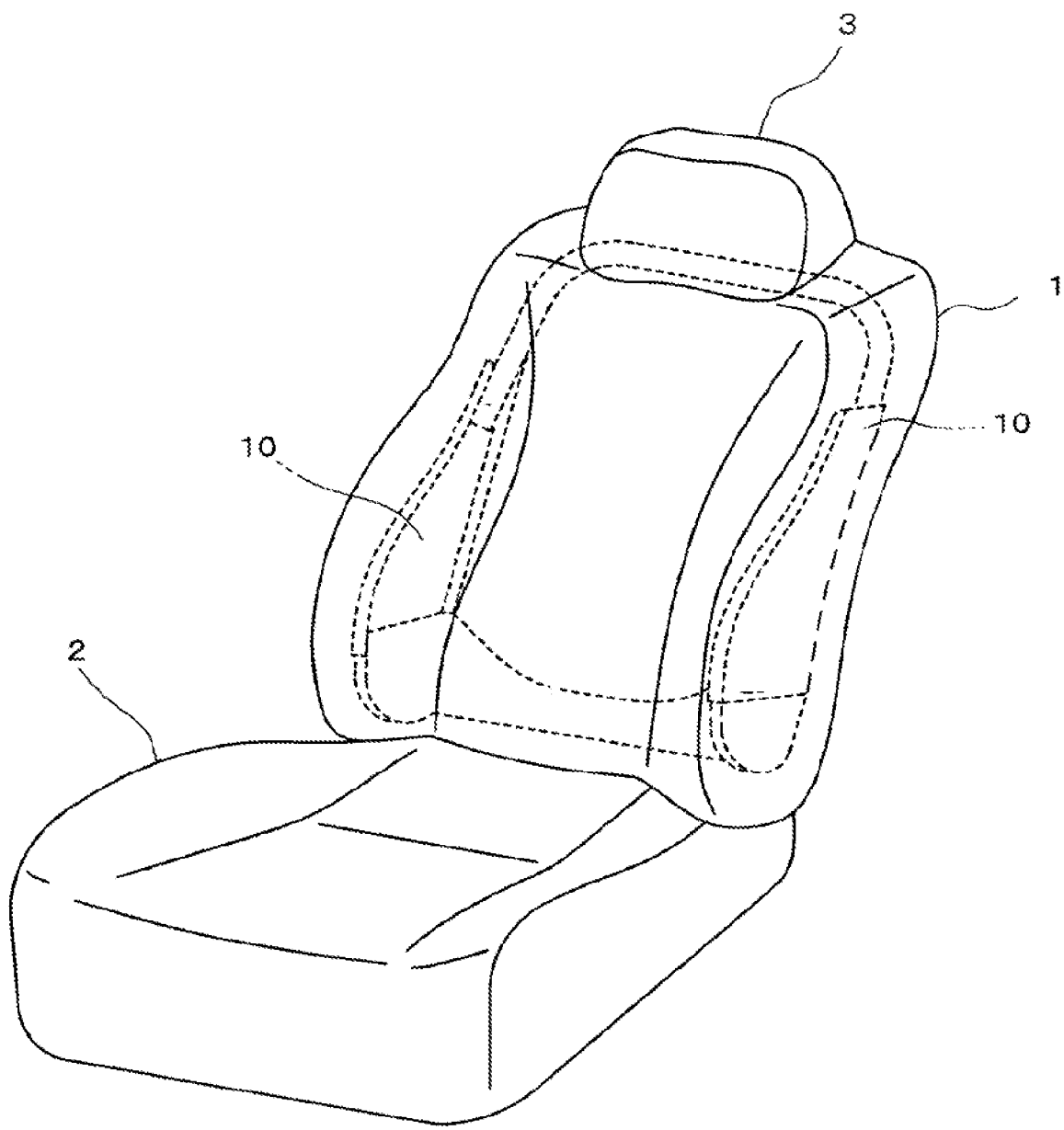
FIG. 1 is a perspective view that mainly shows an external shape of a vehicle seat in which a side airbag device is disposed according to an embodiment of the present invention. An illustration of an airbag unit (module) is omitted from the drawing.
Figure 2:
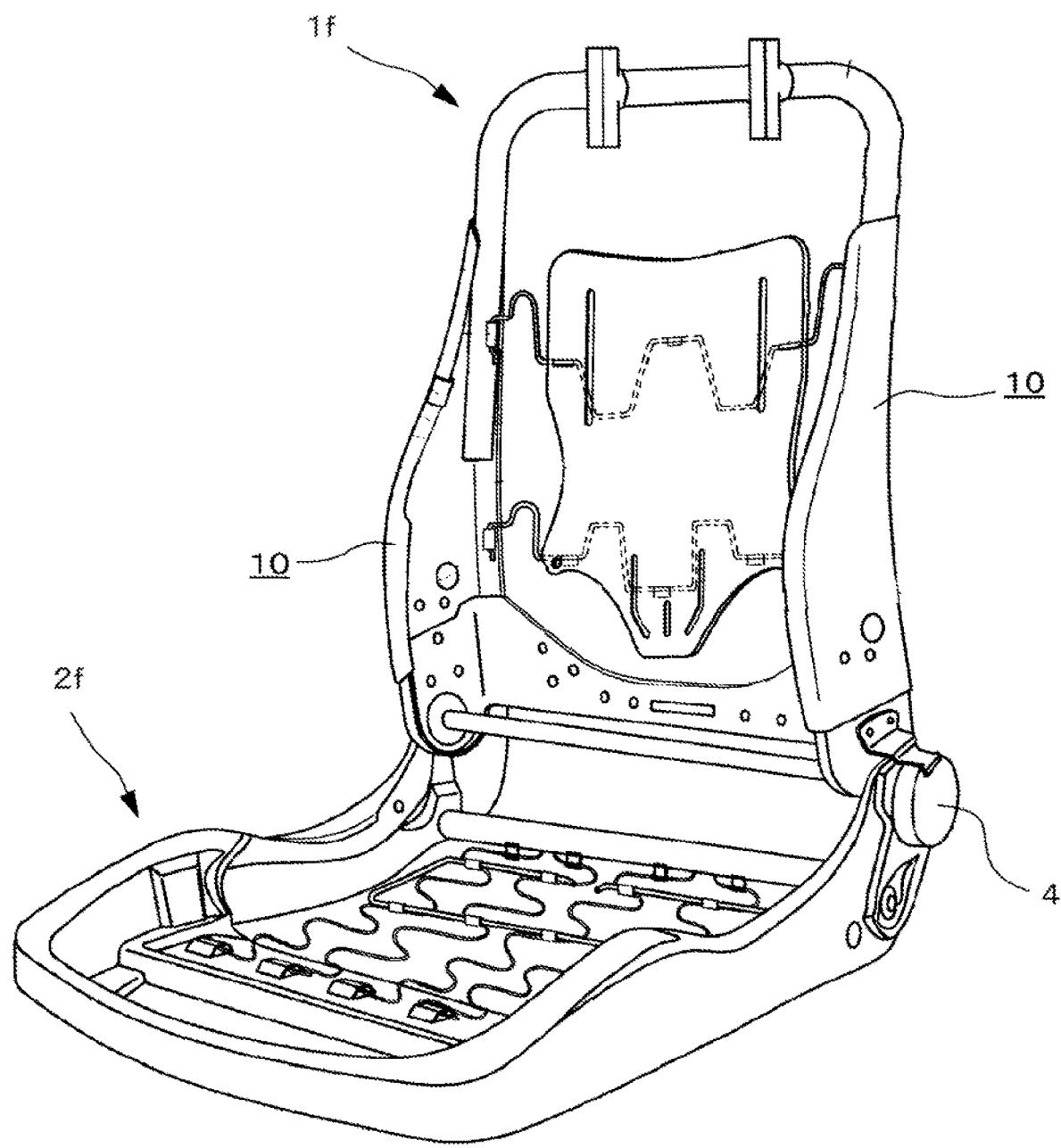
FIG. 2 is a perspective view that shows an internal structure (a seat frame) that works as a framework of the vehicle seat shown in FIG. 1. An illustration of the airbag unit is omitted from the drawing.
Figure 3:
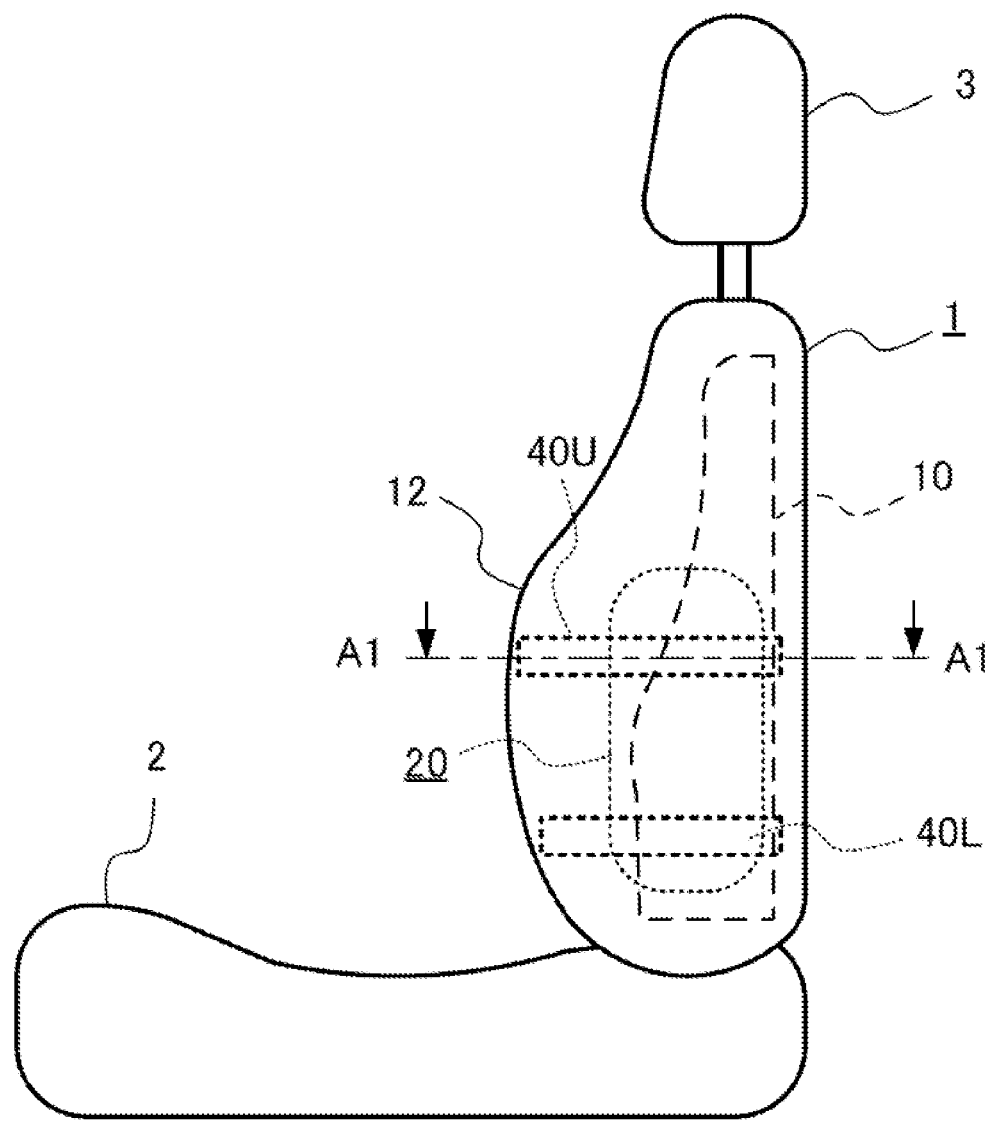
FIG. 3 is a schematic side view of the vehicle seat that has the side airbag device according to an embodiment of the present invention and shows a state in which an airbag device is housed when observed from an outside in a vehicle width direction.
Figure 3:
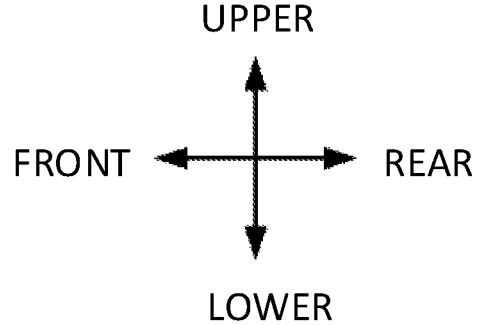

FIG. 1 is a perspective view that mainly shows an external shape of a vehicle seat in which a side airbag device is provided according to an embodiment of the present invention. But, an illustration of an airbag device 20 (see FIG. 3) is omitted from the FIG. 1. FIG. 2 is a perspective view that shows an internal structure (a seat frame) that works as a framework of the vehicle seat shown in FIG. 1. Here as well, an illustration of the airbag device 20 (See FIG. 3) is omitted from FIG. 2. FIG. 3 is a schematic side view of the side airbag device according to an embodiment of the present invention and shows a state in which an airbag device 20 is housed (stored) on a side (a near side) that is close to a door of the vehicle seat when observed from an outside in a vehicle width direction. Further, note that a direction that faces toward the right hand of the occupant, who sits on a seat in a normal sitting attitude, from a center of the seat in the vehicle width direction denotes "right," and similarly, a direction faces toward the left hand of the occupant from the center of the seat denotes "left."

As shown in FIGS. 1 and 2, when specifically viewed as parts, the vehicle seat according to the present embodiment includes a seat cushion 2 on which an occupant sits, a seat back 1 that includes a backrest, and a headrest 3 that is connected to an upper end of the seat back 1.

A seat back frame 1f that forms a framework of the seat is provided inside the seat back 1. A pad 16 (refer to FIG. 7) that is composed of such as a urethane forming material is provided on the surface and the circumference of the seat back frame 1f. Further, the surface of the pad 16 is covered by a seat cover 14 (refer to FIG. 7) such as leather or fabric. A seating frame 2f is provided on the bottom side of the seat cushion 2. The pad that is composed of such as the urethane forming material is provided on the upper surface and the circumference of the seating frame 2f. Further, the surface of the pad is covered by the seat cover 14 such as the leather or the fabric. The seating frame 2f and the seat back frame 1f are connected via a reclining mechanism 4.

As shown in FIG. 2, the seat back frame 1f includes side frames 10, an upper frame, and a lower frame in a frame shape. Specifically, side frames 10 are separately positioned at the right and left sides and extend in a vertical direction. The upper frame connects the upper ends of the side frames 10. Further, the lower frame connects the lower ends of the side frames 10. The headrest 3 is configured by being provided with a cushion member at an outside of a headrest frame.

Figure 4:
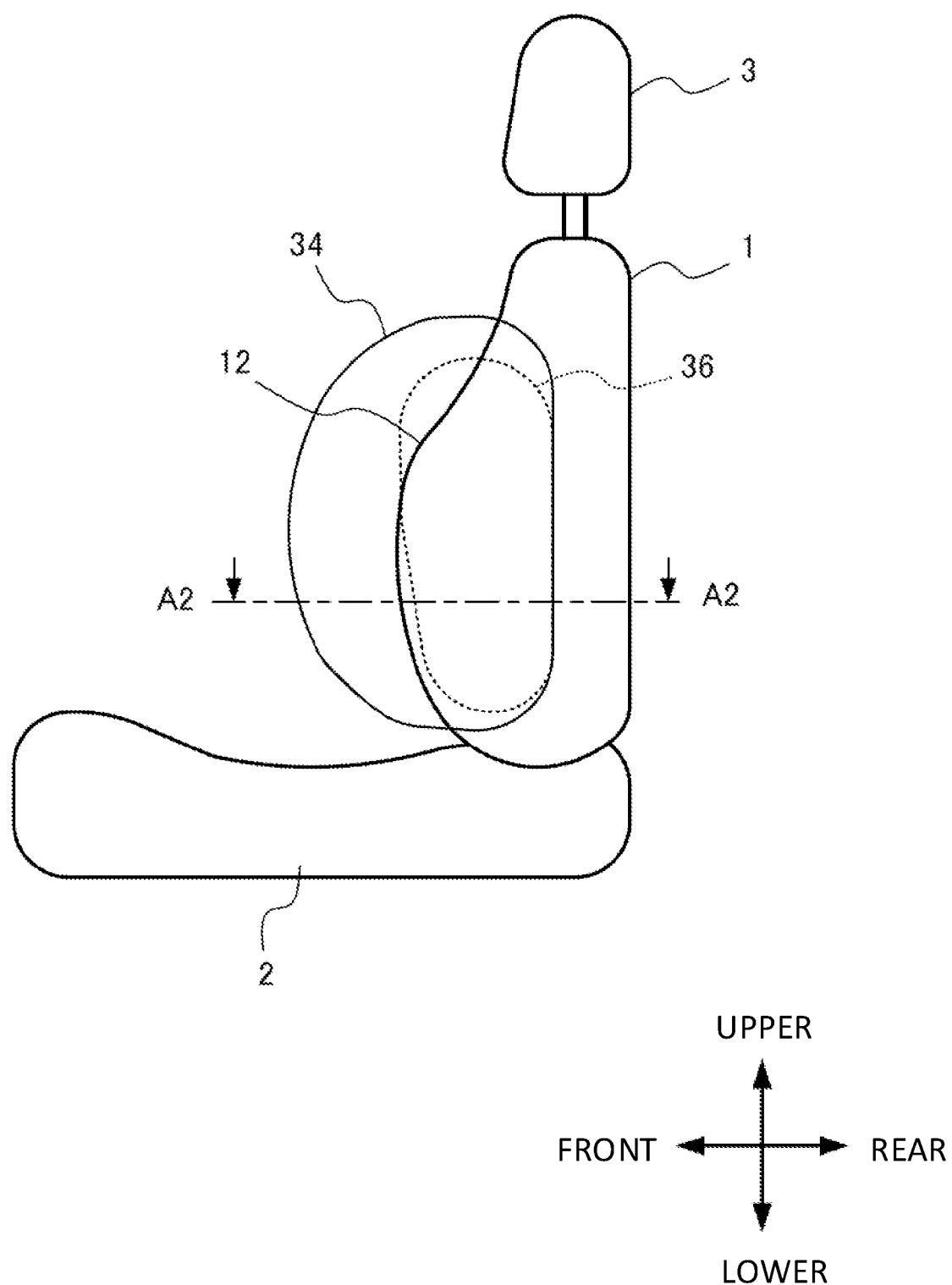
FIG. 4 is a schematic view (a side view) that shows a state in which the side airbag device according to an embodiment of the present invention is deployed.

FIG. 4 is a schematic view (a side view) that shows a state in which a side airbag device according to an embodiment of the present invention is deployed. As shown in FIG. 4, an airbag (34 and 36) includes a first chamber 34 that is deployed toward the vehicle front side of a side support part 12 and a second chamber 36 that is deployed at an inward side than the first chamber 34 in the vehicle width direction. Basically, the second chamber 36 is deployed so as to overlap with a frame sidewall portion 10a when viewed from a side of the vehicle (in the vehicle width direction). On the other hand, the first chamber 34 is deployed so as not to overlap with the frame sidewall portion 10a when viewed from the side of the vehicle (in the vehicle width direction).

The second chamber 36 is designed to be protruded and deformed toward an occupant side at a location corresponding to at least a front part of the side support part 12. Further, the second chamber 36 is positioned at a lower part of the side support part 12 (refer to FIG. 4) and the side support part 12 touches and pushes a waist of the occupant due to the deployment of the second chamber 2. Because the waist that is close to a centroid position of the human body is pushed, the occupant restraint performance is improved in an initial stage on the occurrence of an accident. A capacity of the second chamber 36 is set to be smaller than a capacity of the first chamber 34. Preferably, the second chamber 36 may be deployed only inside (within) the side support part 12 by adjusting the shape and the capacity of the second chamber 36. That is, the second chamber 36 being deployed may also be prevented from protruding (expanding) to a position that is located at the vehicle front side than the front edge part of the side support part 12. In other words, a front end of the deployed second chamber 36 may not exceed from the front edge part of the side support part 12. As a result, the second chamber 36 can be fully deployed sooner than the first chamber 34. In addition, a greater amount of an inflation gas can be filled in the first chamber 34 than the second chamber 36.

The first chamber 34 is deployed toward the vehicle front side at the outside of the side support part 12. The deployment shape and the deployment direction of the first chamber 34 can be adjusted by such as an airbag folding method, a position of the folded airbag, a setting of a gas jetting direction of an inflator, and a gas flowing direction between the first chamber 34 and the second chamber 36. As a result, because the deployment obstruction of the first chamber 34 due to the deployment of the second chamber 36 decreases, the deployment of the first chamber 34 becomes smooth. Therefore, the occupant protection performance is improved by the cooperation of the deployments of the first and second chambers 34 and 36 in addition to the smooth deployment of the first chamber 34.

Figure 5A:
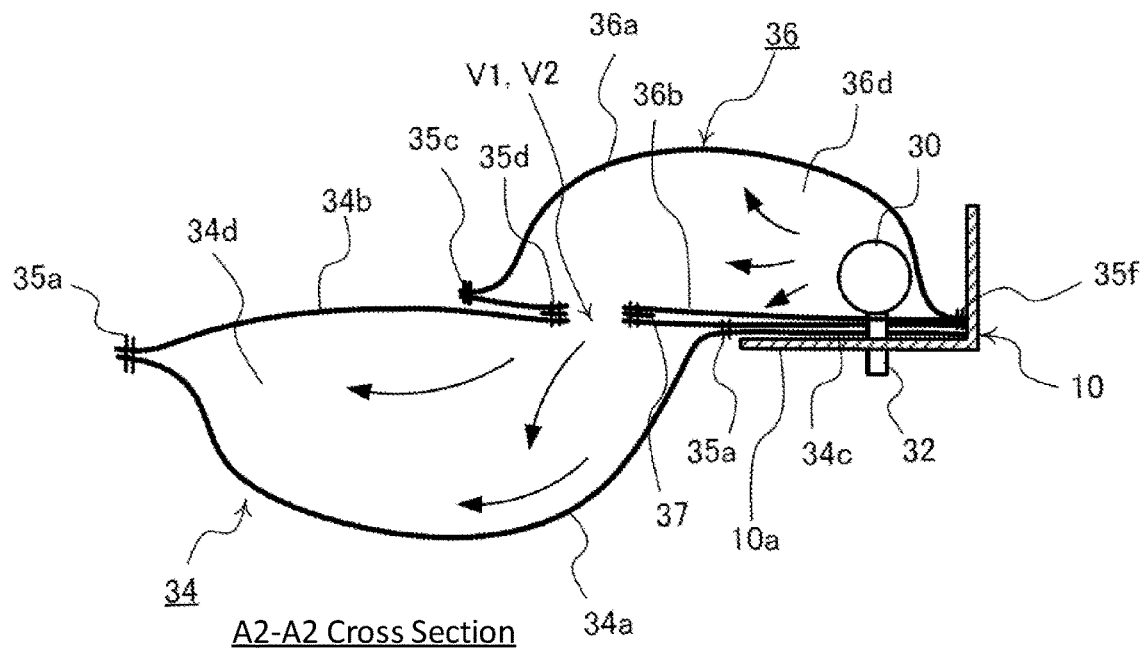
FIGS. 5A and 5B are schematic views that show the deployment state of the side airbag device according to an embodiment of the present invention and correspond to cross sections along the A2-A2 direction shown in FIG. 4.
Figure 5B:
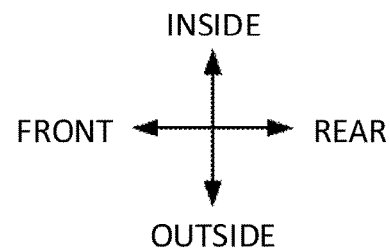

FIGS. 5A and 5B are schematic views that show the deployment states of the side airbag device and that correspond to a cross section along the A2-A2 direction shown in FIG. 4. FIG. 5A shows a configuration in which a connection panel 37 is used and FIG. 5B shows a configuration in which the connection panel 37 is not used. FIGS. 6A-6C are plan views that show component parts of the airbag (34 and 36) that is used for the side airbag device according to an embodiment of the present invention. A1 and A2 parts shown in FIG. 6A correspond to panels for making the first chamber 34. B1 and B2 parts shown in FIG. 6B correspond to panels for making the second chamber 36. A C part shown in FIG. 6C corresponds to the connection panel 37.

Figure 5B:
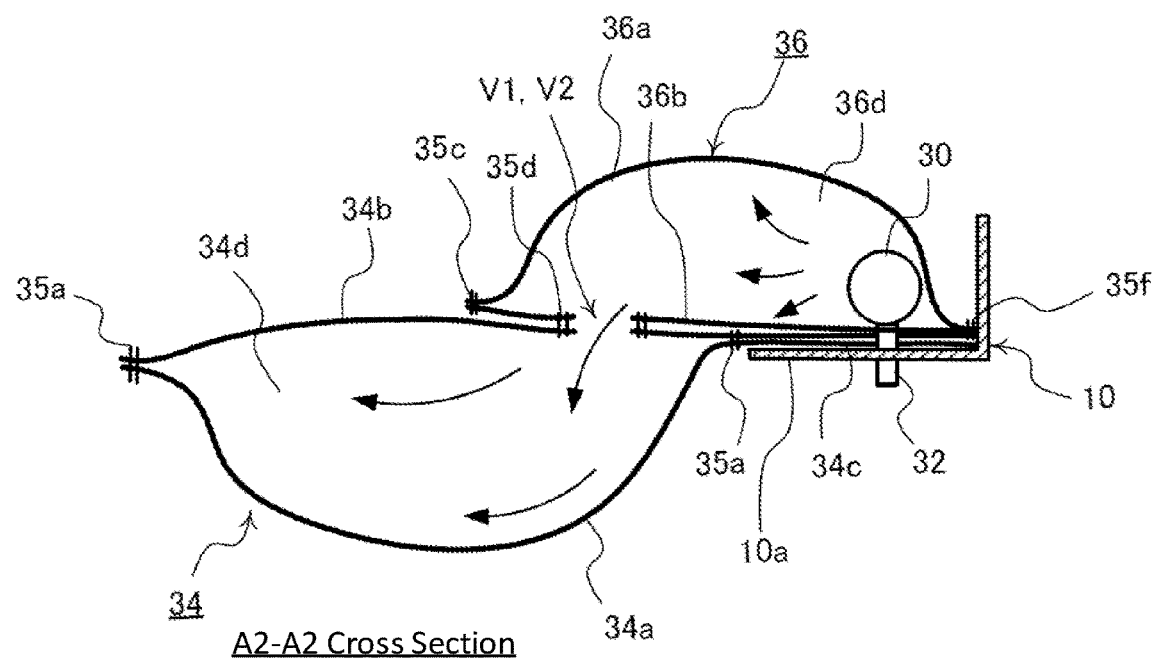

As shown in FIG. 5, in the present embodiment, an inflator 30 is housed inside the second chamber 36. As the inflator 30, for instance, an inflator having a cylindrical shape can be used. A pair of upper and lower stud bolts 32 projects toward an outer side in the vehicle width direction from an outer circumferential part of the inflator 30. These stud bolts 32 are attached (fastened and fixed) to the side frame 10 by a nut. A plurality of gas jetting ports being lined up in a circumferential direction are formed at the inflator 30 and the gas is radially jetted from the plurality of gas jetting ports. Further, a diffuser that controls the gas flows can be provided when necessary.

An airbag controlling ECU that is mounted on the vehicle is electrically connected to the inflator 30. A satellite sensor that detects a side collision is electrically connected to the airbag controlling ECU. The inflator 30 can be configured to be operated when the airbag controlling ECU detects the side collision in response to (based on) a signal from the satellite sensor.

As shown in FIGS. 5A and 6A, two panels 34a and 34b (A1 and A2 parts) that correspond to the first chamber 34 are formed in the same shape and an expansion region 34d is formed by sewing 35a. Further, as shown in FIGS. 5A and 6B, two panels 36a and 36b (B1 and B2 parts) that correspond to the second chamber 36 are formed in the same shape and an expansion region 36d is formed by sewing 35c at an outer edge.

As shown in FIG. 6A, vent holes V1a and V1b are formed in the inner panel 34b of the first chamber 34. Further, as shown in FIG. 6B, vent holes V2a and V2b are formed in the inner panel 36b of the second chamber 36. The second chamber 36 fluidly communicates with the first chamber 34 via the vent holes V2a, V2b, V1a, and V1b. Thus, the inflation gas that is initially provided in the second chamber 36 flows in the first chamber 34 via the vent holes V2a, V2b, V1a, and V1b.

In regards to the configuration shown in FIG. 5A, the connection panel 37 is interposed between the inner panel 34b of the first chamber 34 and the inner panel 36b of the second chamber 36. As shown in FIGS. 6A-6C, connection vent holes V3a and V3b are formed in the connection panel 37 at positions corresponding to the vent holes V1a and V2a and the vent holes V1b and V2b of the panels 34b and 36b, respectively. Further, in regards to the configuration shown in FIG. 5B, the connection panel 37 is only omitted and there are no other structural differences between the configurations shown in FIGS. 5A and 5B.

In the first chamber 34, a non-expansion region 34c is formed at a position located at the vehicle rear side than the expansion region 34d. The non-expansion region 34c is disposed closely to the frame sidewall portion 10a of the side frame 10. A hole 34e through which the inflator 30 passes and a hole 34g through which the stud bolt 32 passes are formed in the non-expansion region 34c at the corresponding positions of the outer and inner panels 34a and 34b. Further, similarly, a hole 36e through which the inflator 30 passes and a hole 36g through which the stud bolt 32 passes are formed in the inner panel 36b of the second chamber 36. Further, in the present embodiment, the above explanations are based on a quick installation method of the inflator (the method in which an edge of the harness connection side of the inflator is exposed). However, another method in which the entire inflator is housed inside the bag and only the bolt through hole is formed in the panels can also be adopted.

In regards to the manufacturing (the sewing) of the airbag that has the configurations explained above, first, outer edges (at the sewing 35a) of the expansion region 34d of the first chamber 34 are sewed. Thereafter, the connection panel 37 is connected to a pertinent position of the inner panel 34b by sewing 35d. Further, the circumference of the vent hole V1 (vent holes V1a, V2a, and V3a) of the corresponding panels 34b, 36b, and 37, and the circumference of the vent hole V2 (vent holes V1b, V2b, and V3b) of the corresponding panels 34b, 36b, and 37 are respectively connected by sewing 39a and 39b. Note that the detailed illustrations of the sewing 39a and 39b are omitted from FIGS. 6A-6C because the overall structure can be viewed easily. At the same time, outer edges (at the sewing 35c) of the second chamber 36 are sewed. However, only a rear edge part 35f of the second chamber 36 is not sewed at this time. Thereafter, the inflator 30 is positioned inside the second chamber 36 and the stud bolt(s) 32 is pulled out to the outside of the frame sidewall 10a of the side frame 10. Further, the inner panel 36b of the second chamber 36 and the connection panel 37 are connected by sewing at the sewing part 35d. Lastly, the rear edge part 35f of the second chamber 36 is closed by sewing. At this time, it is preferred that the rear edge part 35f of the second chamber 36 is connected to the first chamber 34 by sewing. As a result, it is possible to prevent the first chamber 34 and the second chamber 36 from being flapped at the time of the deployment of the airbag.

In the embodiments according to the present invention, the first chamber 34 and the second chamber 36 are basically connected together only at the periphery (at the sewing 35d) of the vent holes V1 and V2. As explained above, because the entire outer edges of the first chamber 34 and the second chamber 36 are not sewed, the deployment of the one chamber is not obstructed by the deployment of the other chamber. That is, because the interference between the first chamber 34 and the second chamber 36 can be minimally suppressed at the time of the deployment of the airbag, the deployment behavior of each chamber becomes stable. At the same time, there is an advantage that because the thickness (an expansion amount of the airbag) can be greatly ensured, the impact absorbing performance can be improved.

First Embodiment

Figure 7:
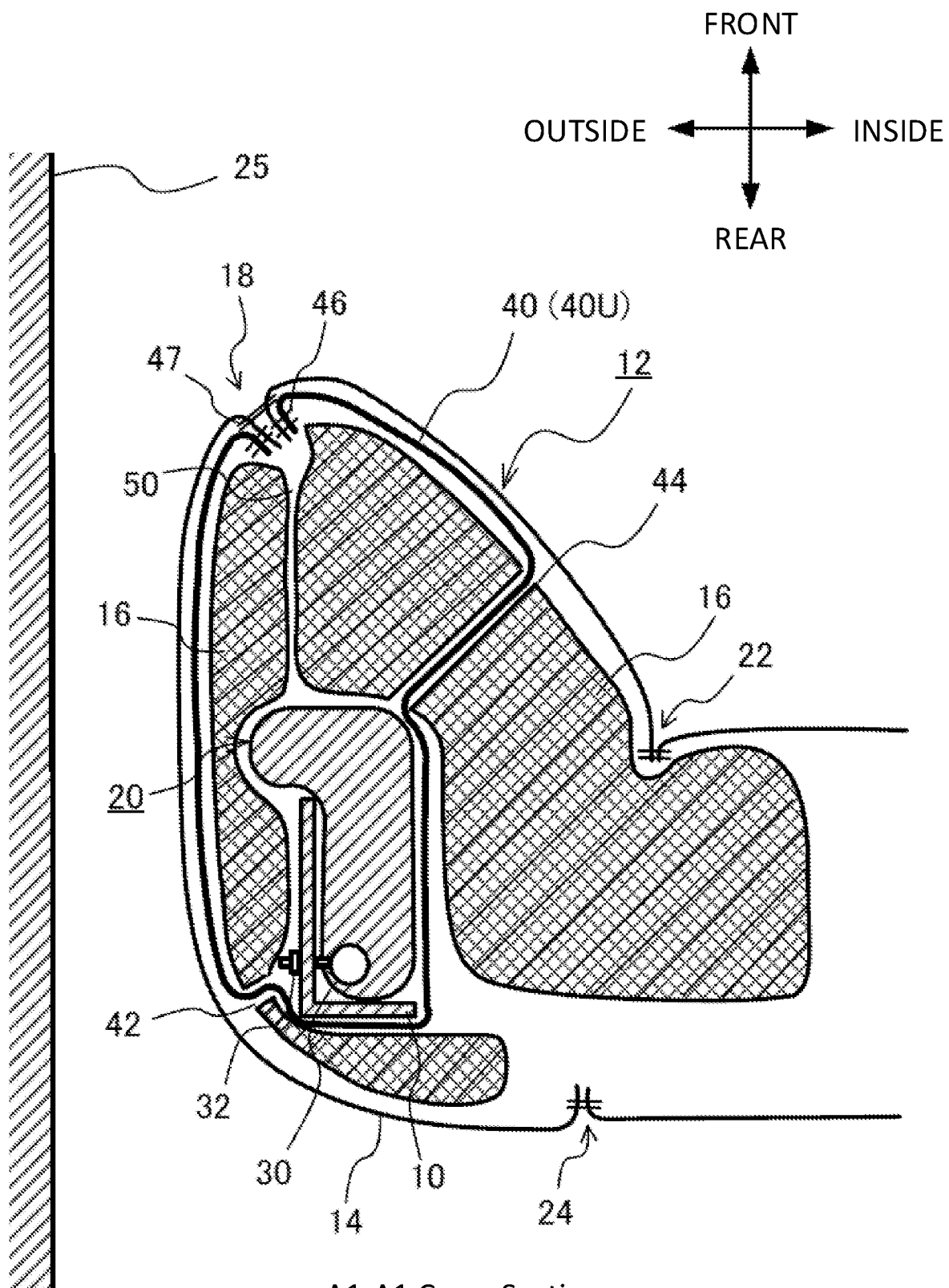
FIG. 7 is a cross sectional view that shows a structure of the side airbag device according to a first embodiment of the present invention.
Figure 8A:
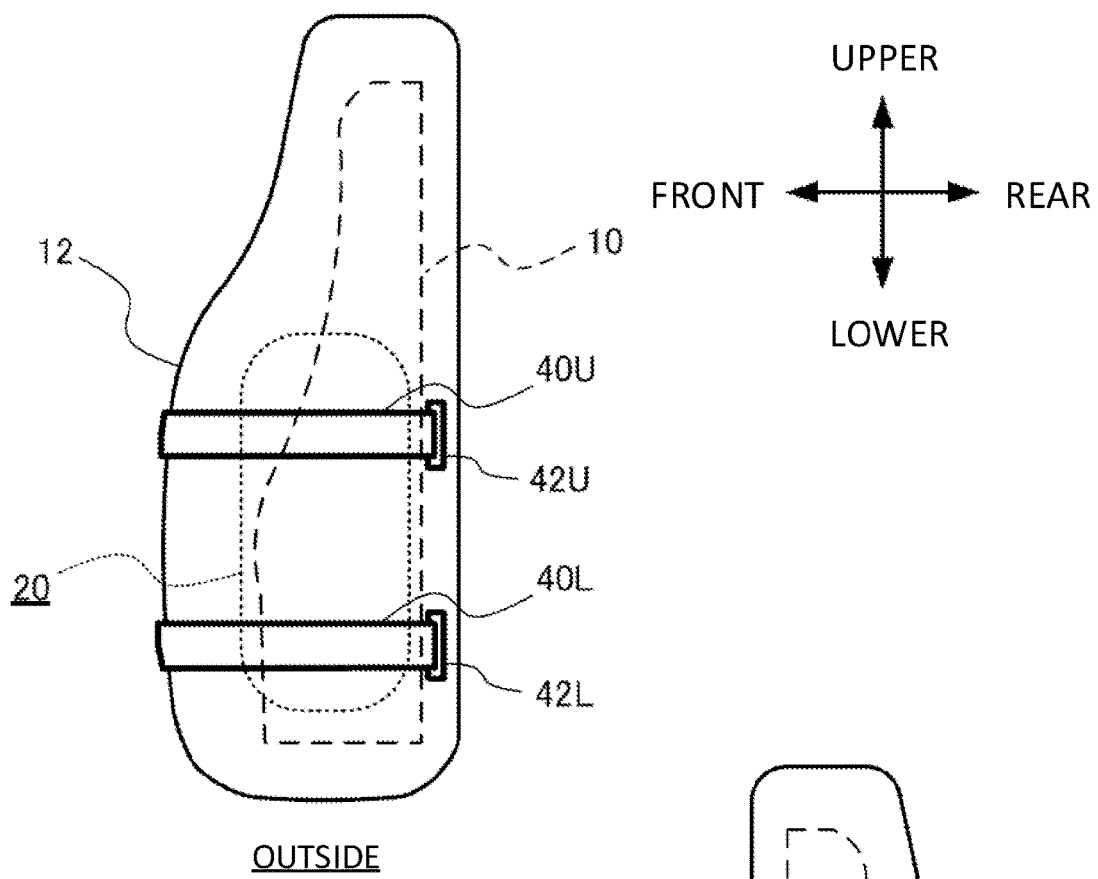
FIGS. 8A and 8B are schematic side views that show a housed (stored) state of the side airbag device according to the first embodiment of the present invention. Specifically, FIG. 8A corresponds to the schematic side view when observed from an outer side in a vehicle width direction.
Figure 8A:
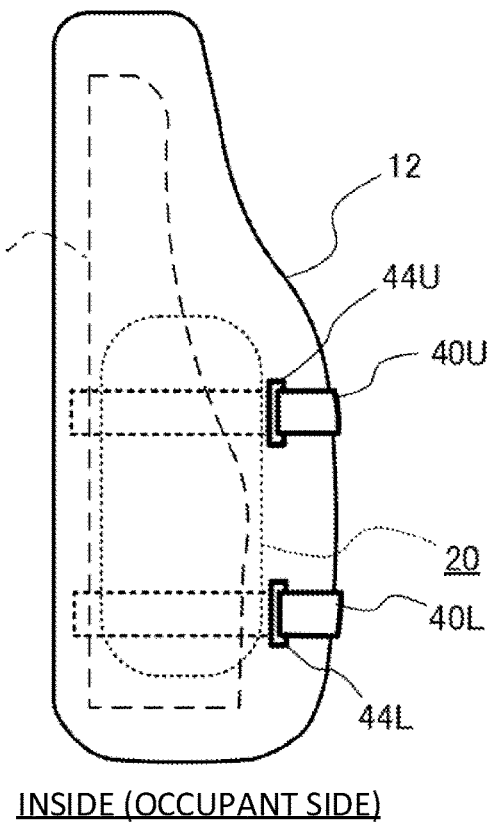
Figure 8B:
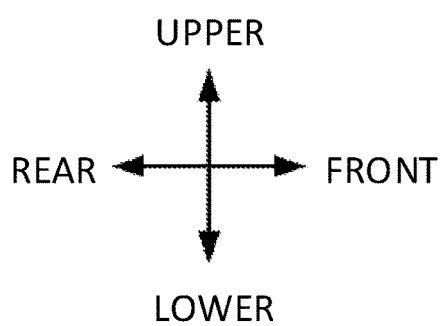

FIG. 7 is a cross-sectional view that shows a structure of the side airbag device according to a first embodiment of the present invention. FIG. 7 corresponds to a part of a cross section along the A1-A1 direction shown in FIG. 3. FIGS. 8A and 8B are schematic side views that show a housed (stored) state of the side airbag device according to the first embodiment of the present invention. Specifically, FIG. 8A corresponds to the schematic side view when observed from an outer side in a vehicle width direction. FIG. 8B corresponds to the schematic side view when observed from an inner side in a vehicle width direction. When the first embodiment is compared with the second, third, fourth, and fifth embodiments explained below, a main different feature is that an airbag module (a side airbag device) 20 is encircled by one continuous webbing (a stay cloth) 40.

The side frame 10 is formed with (molded of) a resin or a metal and can be in an L-shaped sectional shape or a U-shaped sectional shape as shown in FIG. 7. The side frame 10 has a frame sidewall portion 10a extending along a vehicle travel (advancing) direction when a horizontal section thereof is viewed from an upper side. Further, the airbag module (a side airbag device) 20 is fixed to an inside (a center side of the seat) of the frame sidewall portion 10a.

As shown in FIG. 7, the seat back 1 has a side support part 12 that expands in the vehicle travel direction (toward a vehicle front side) at a side part (end part) in a vehicle width direction. The side airbag device 20 is housed in a space in which a urethane pad 16 is not provided inside the side support part 12. The side airbag device 20 includes airbags 34 and 36 that restrain an occupant by the expansion and the deployment and an inflator 30 that supplies an inflation gas to the airbags 34 and 36.

Each of seams (joints) 18, 22, and 24 of the seat cover 14 of the seat back 1 is connected by being folded inwardly and sewn. Further, the seam 18 located at the vehicle front side is torn and open (is cleaved) when the airbag is deployed. Further, a fragile part (such as a notch and a cutout) as a starting point (bending origin) is formed in the side support part 12. Specifically, the fragile part is to be the starting point (bending origin) when the side support part 12 is bent toward the occupant by the expansion of a second chamber 36.

The airbags 34 and 36 are covered by a flexible cover that is made from the fabric (not shown). With respect to a relationship between a first chamber 34 and the second chamber 36, the airbags 34 and 36 may suitably adopt an optimum compression method in addition to being folded in bellows or being rolled ("folded" includes rolling). In FIG. 7, a reference numeral 25 corresponds to a door trim. Though a detailed illustration is omitted from the drawings, when the airbags 34 and 36 are in a housed (stored) state in which the airbags 34 and 36 are folded, panels for the first chamber 34 and the second chamber 36 are integrally folded after they are overlapped each other in a plane state by being flatly spread out in order to hold a positional relation therebetween at the time of the expansion and the deployment thereof. When the panels for the second chamber 36 and the panels for the first chamber 34 are individually folded, the folded second chamber 36 can be positioned closer to the inflator 30 than the folded first chamber 34. Alternatively, the folded second chamber 36 can also be positioned between the folded first chamber 34 and the side frame 10. That is, the folded second chamber 36 can be positioned closer to a side of the occupant relative to the folded first chamber 34.

The side airbag device according to the first embodiment of the present invention has the webbings 40 (40U and 40L) that cover at least a part of the airbag module 20 being in the housed (stored) state. Each of the webbings 40 is formed by a band-shaped (belt-shaped) cloth. As shown in FIGS. 3 and 8, the two webbings 40 are provided at the upper and lower sides of the airbag module 20 in a vertical direction. Specifically, the webbing 40U (one round) is provided at the upper side of the airbag module 20. The webbing 40L (one round) is provided at the lower side of the airbag module 20.

When the airbag module 20 is viewed from above in a horizontal plane as shown in FIG. 7, each of the webbings 40 (40U, 40L) extends from the rear side of the airbag module 20 along the inner surface of the airbag module 20, passes through the pad 16 that forms the side support part 12 via a slit 44, and reaches an external side of the side support part 12. Further, each of the webbings 40 (40U, 40L) further extends along an outer surface of the side support part 12 and reaches proximately a front edge part of the side support part 12. The slit 44 extends toward the airbag module 20 in a direction substantially orthogonal to an inner surface of the side support part 12 so that the slit 44 spans between the outer surface and the inner surface of the side support part 12.

Further, each of the webbings 40 (40U, 40L) extends proximately from the front edge part of the side support part 12 along the outer surface of the side support part 12, passes the pad 16 via a slit 42 from the outside toward the inside of the pad 16, and reaches the rear side of the airbag module 20. That is, each of the webbings 40 (40U, 40L) encircles (surround) the airbag module 20 along (together) with (in one united body with) the pad 16 of the side support part 12. As a result, it becomes possible that the deployment behavior of the airbags 34 and 36, especially the deployment behavior of the second chamber 36, is controlled more certainly.

As shown in FIG. 7, ends of each of the webbings 40 (40U, 40L) are connected to edges of the seat cover 14 by sewing 46 inside a seam 18 of the seat cover 14 that is located at a tip side of the side support part 12. Further, the edges of the seat cover 14 are connected by sewing 47 that is able to be broken. Thus, such the edges connected by the sewing 47 are to be a starting point of the cleavage (tearing and opening) when the airbag (34 and 36) is deployed. Further, a slit 50 is formed inside the seam 18 of the seat cover 14 for cleaving the pad 16 when the airbag (34 and 36) is deployed. The slit 50 extends from the tip side of the side support part 12 to the airbag module 20. At the time of the deployment of the airbag (34 and 36), the sewing 46 and 47 for each of the webbings 40 and the seat cover 14 are broken and the ends of each of the webbings 40 (40U, 40L) are outwardly spread (See FIG. 9A). Thereafter, the first chamber 34 is expanded instantaneously from the cleavage part of the pad 16 and becomes possible to be promptly deployed toward an external side of the side support part 12 (See FIG. 9B).

Further, there is also an advantage that the webbings 40 (40U, 40L) efficiently transit energy of the expansion and the deployment of the airbags 34 and 36 to the pad (a urethane structure (simply referred to as "pad") 16 and makes the deployment speed of the airbags 34 and 36 improve by accelerating the cleavage of the seat itself.

Figure 9A:
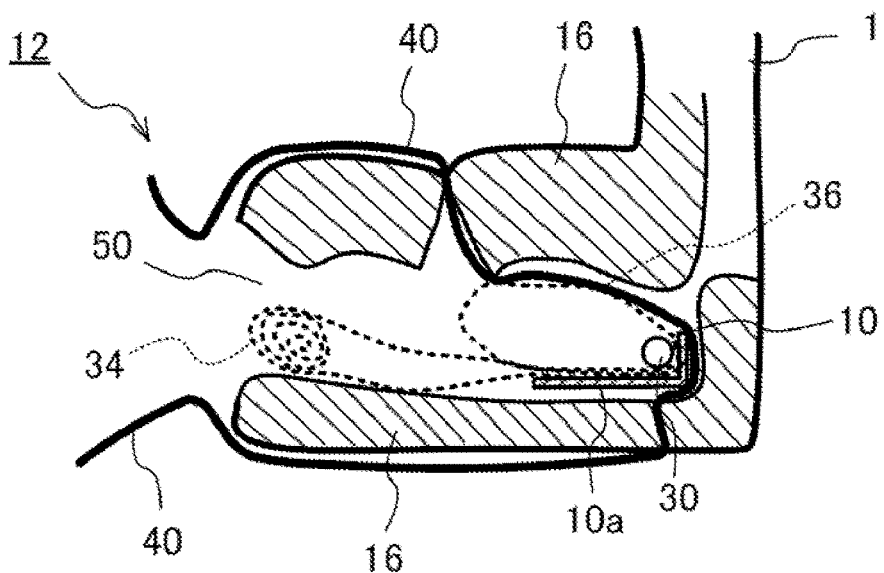
FIGS. 9A and 9B are schematic views that show a deployment behavior of the side airbag device according to the first embodiment of the present invention. Specifically.
Figure 9B:
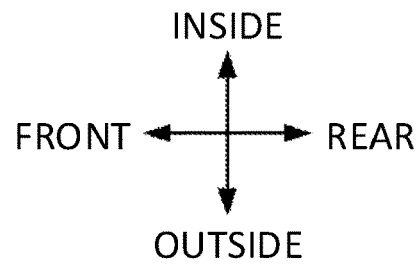
Figure 9B:
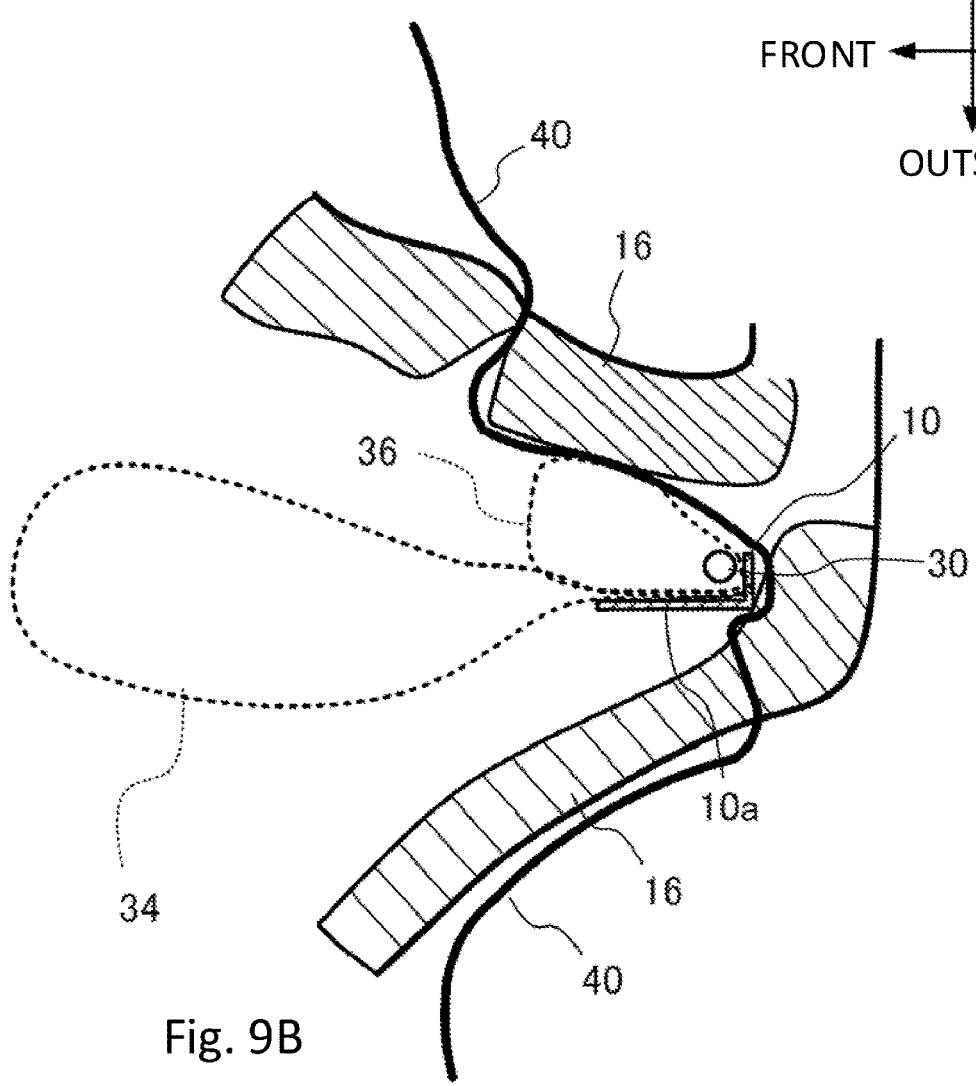

FIGS. 9A and 9B are schematic (cross-sectional) views that show the deployment behavior of the side airbag device according to the first embodiment of the present invention. FIG. 9A shows a state of an initial stage of the deployment. FIG. 9B shows a state of a later stage of the deployment. As shown in FIG. 9A, in the above configuration according to the first embodiment of the present invention, the second chamber 36 is deployed inside the side support part 12 in the initial stage of the operation of the airbag device 20 so that the seat cover 14 is cleaved from the seam (sewing part) 18. Further, because the second chamber 36 is deployed and the seat cover 14 is cleaved, the tip side of the side support part 12 is bent or is protruded and deformed toward the compartment side (the inner side of a vehicle). As a result, the occupant is restrained while the occupant is pushed toward the inward side in the vehicle width direction.

As shown in FIG. 9A, the unfavorable situation, in which the second chamber 36 is deployed toward an inner side in the vehicle width direction so as to enter the rear of the pad 16 and go around the back side of the occupant in the initial stage of the deployment of the airbags 34 and 36 (See FIG. 10), can be avoided. That is, the deployment direction of the second chamber 36 is guided toward the vehicle front side by the regulation of the webbing(s) 40. As a result, the injuriousness with respect to the occupant can be suppressed and a restraining function can be maximally performed (achieved).

Figure 10:
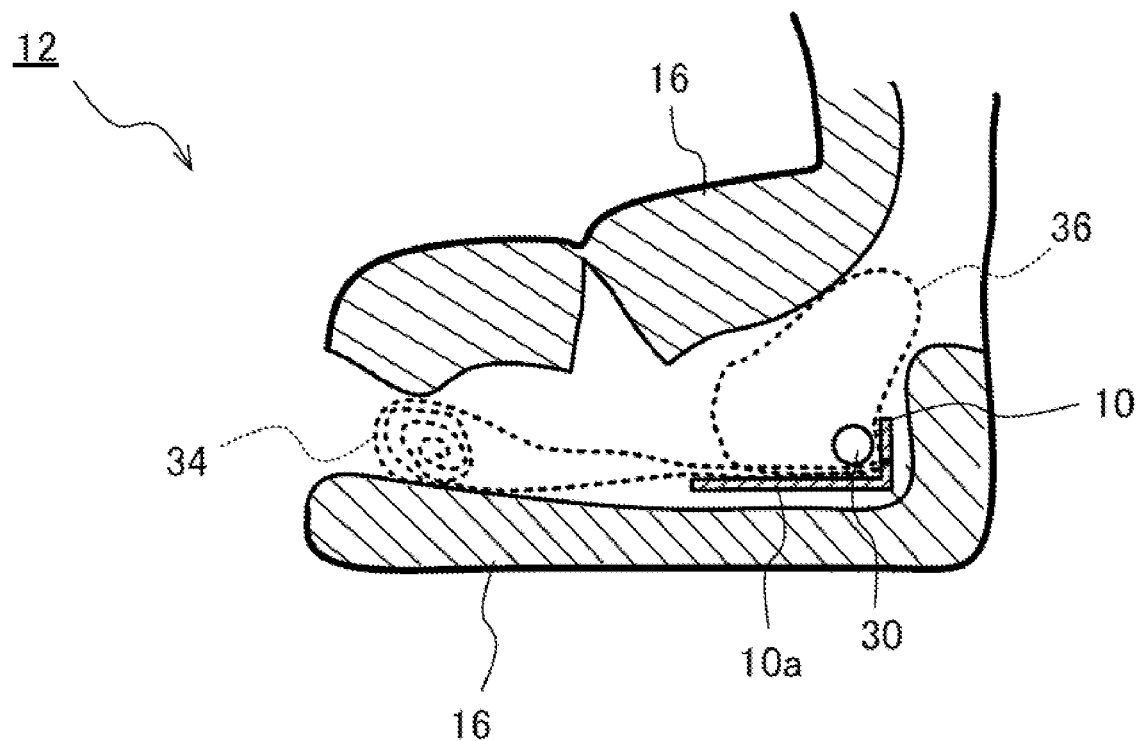
FIG. 10 is a schematic view that shows a state of an initial stage of the deployment of a side airbag device according to a comparative example.

Here, when the webbing 40 is not used, as shown in FIG. 10, the second chamber 36 goes around the back side of the occupant and a force for pushing the occupant from the back toward a slanting front side is generated. As a result, there is a possibility that the occupant may move toward the direction in which the seat belt is pulled out.

Next, as shown in FIG. 9B, when the airbags 34 and 36 are further expanded, the first chamber 34 is fully deployed toward the vehicle front side and protects the occupant at the time of the vehicle collision.

Other embodiments and variations according to the present invention are explained below. However, the redundant explanations with respect to the same or corresponding components as the first embodiment explained above are omitted but the same reference numerals are used for labeling.

Second Embodiment

Figure 11:
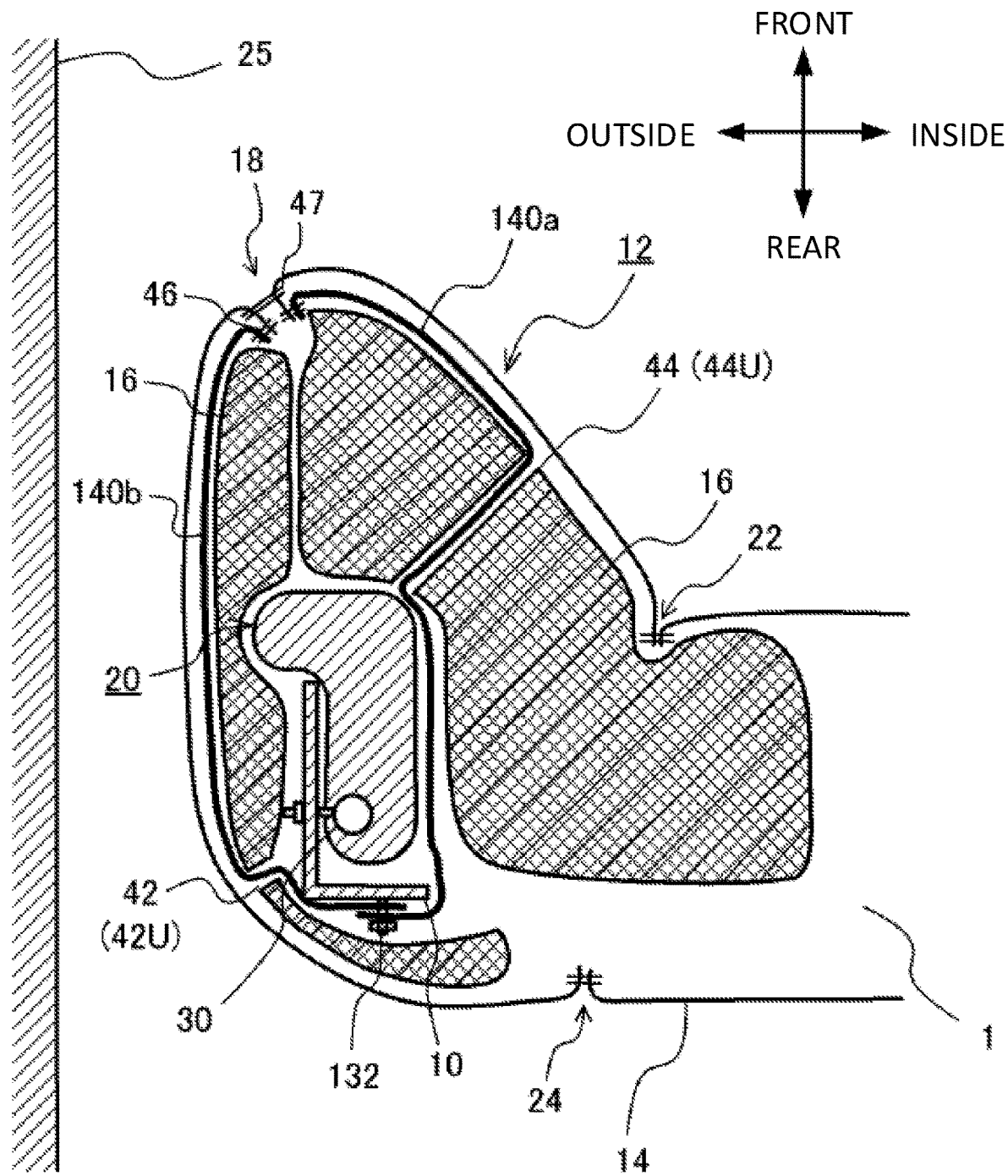
FIG. 11 is a cross sectional view that shows a structure of the side airbag device according to a second embodiment of the present invention.

FIG. 11 is a cross-sectional view that shows a structure of the side airbag device according to a second embodiment of the present invention. FIG. 11 corresponds to a part of a cross section along the A1-A1 direction shown in FIG. 3. Further, because the second embodiment is different from the first embodiment explained above only with respect to a configuration relating to a webbing, only different features will be explained below. Further, when the second embodiment is compared with the other embodiments, a main different feature of the second embodiment is that two webbings 140a and 140b are used and rear ends of the webbings 140a and 140b are fixed to the side frame 10.

First, in the present embodiment, one round of the webbing 140 (in the final configuration) is formed by two band-shaped cloths (webbings) 140a and 140b. The webbing 140a that is disposed at an inner side (the occupant side) has a fixed end that is fixed to the side frame 10 by a bolt 132 at a rear end part of the airbag module 20. The webbing 140a extends from the fixed end part along the inner surface of the airbag module 20, passes through the pad 16 via the slit 44, and reaches the external side of the side support part 12. Further, the webbing 140a further extends along the outer surface of the side support part 12 and reaches proximately the front edge part of the side support part 12.

On the other hand, the webbing 140b that is disposed at an outer side (a side of a door trim 25) extends along the outer surface of the side support part 12 proximately from the front edge part of the side support part 12, and passes through the pad 16 via the slit 42 extending in a direction from the outside toward the inside, and reaches the rear end part of the airbag module 20. Thereafter, an end of the webbing 140b is fixed to the side frame 10 together with the fixed end of the webbing 140a by the bolt 132.

Front ends of the webbings 140a and 140b are connected to the edges of the seat cover 14 by the sewing 46 inside the seam 18 of the seat cover 14 that is located at the tip side of the side support part 12. Further, the edges of the seat cover 14 are connected by the sewing 47 that is able to be broken. Thus, such the edges connected by the sewing 47 are to be the starting point of the cleavage (tearing and opening) when the airbag (34 and 36) is deployed.

In the present embodiment, because the rear ends of the two webbings 140a and 140b are fixed to the side frame 10 by using the bolt 132, the webbings 140a and 140b are not displaced at the time of the deployment of the airbag (34 and 36). As a result, the deployment behavior of the airbag (34 and 36) can be certainly controlled.

Third Embodiment

Figure 12:
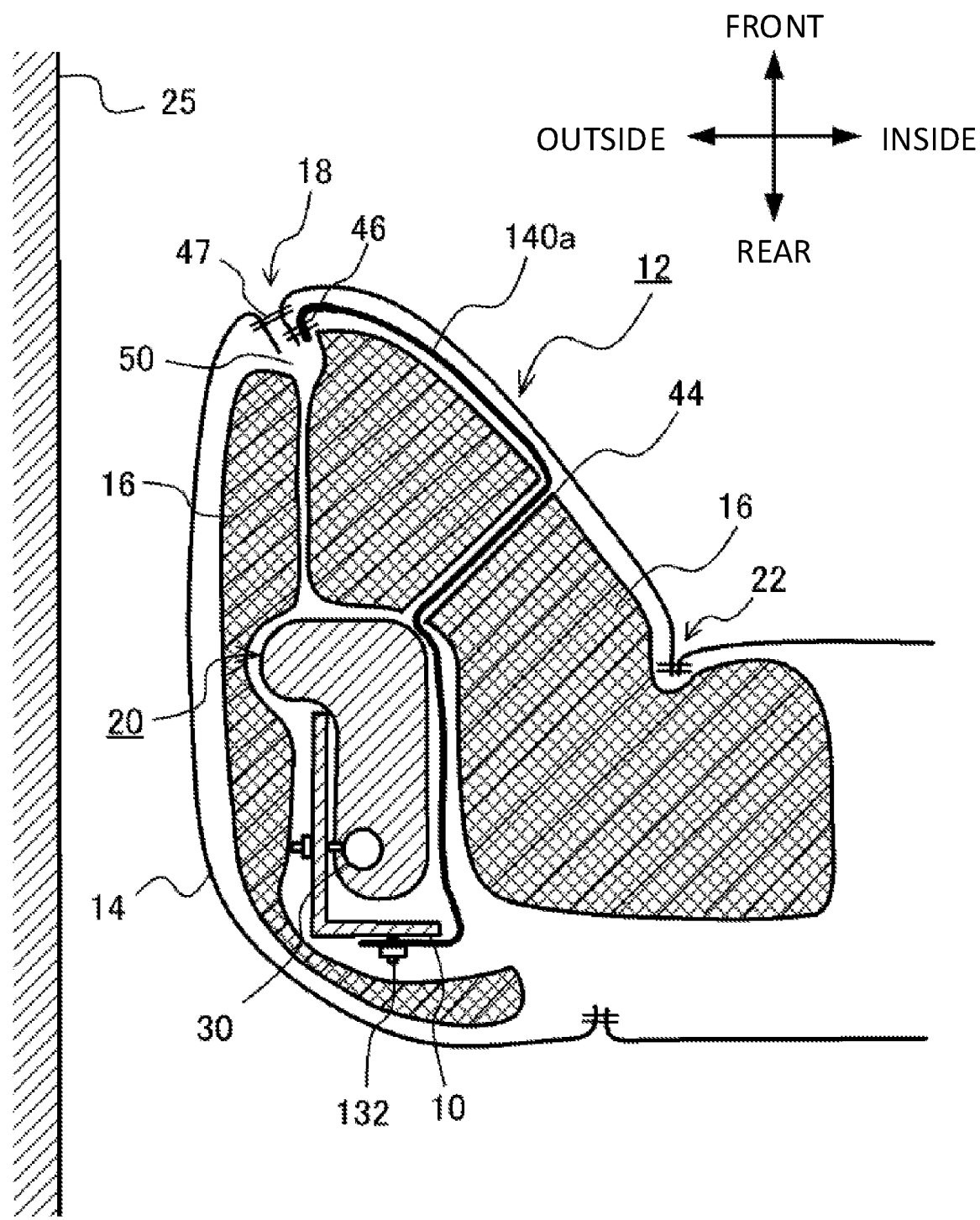
FIG. 12 is a cross-sectional view that shows a structure of the side airbag device according to a third embodiment of the present invention.

FIG. 12 is a cross-sectional view that shows a structure of the side airbag device according to a third embodiment of the present invention. FIG. 12 corresponds to a part of a cross section along the A1-A1 direction shown in FIG. 3. Further, because the third embodiment is different from the first and second embodiments explained above only with respect to a configuration relating to a webbing, only different features will be explained below.

In short, the present embodiment relates to a minimum configuration in which only the webbing 140a is disposed at the inner side (the occupant side) of the air module 20. In the same manner as the second embodiment, the webbing 140a has the fixed end that is fixed to the side frame 10 by the bolt 132 at the rear end part of the airbag module 20. The webbing 140a extends from the fixed end part along the inner surface of the airbag module 20, passes through the pad 16 via the slit 44, and reaches the external side of the side support part 12. Further, the webbing 140a further extends along the outer surface of the side support part 12 and reaches proximately the front edge part of the side support part 12.

The front end of the webbing 140a is connected to the edge of the seat cover 14 by the sewing 46 inside the seam 18 of the seat cover 14 at the tip side of the side support part 12. Further, the edges of the seat cover 14 are connected by the sewing 47 that is able to be broken.

In the present embodiment, because the configuration, in which the webbing 140a is disposed at only the inner side (the occupant side) of the air module 20, is adopted, it becomes possible to simplify the overall configuration and reduce the cost. As explained above, in the present embodiment, though the webbing 140a as the minimum configuration is adopted, in the same manner as the first and second embodiments, the deployment behavior (the deployment direction) of the second chamber 36 can be properly controlled.

First Variation of First Embodiment

Figure 13:
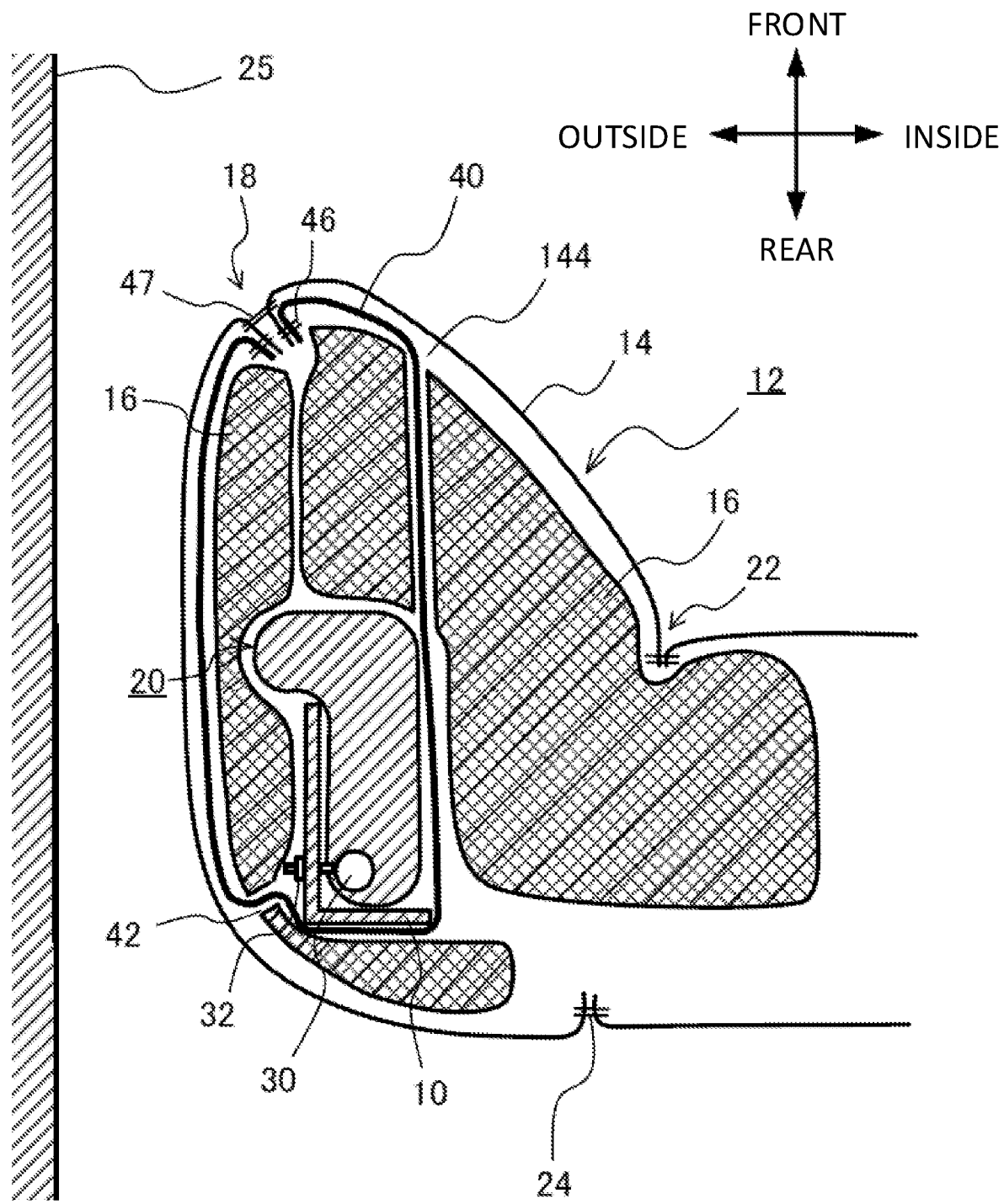
FIG. 13 is a cross-sectional view that shows a structure of the side airbag device according to a first variation of the first embodiment of the present invention.

FIG. 13 is a cross-sectional view that shows a structure of the side airbag device according to a first variation of the first embodiment of the present invention. FIG. 13 corresponds to a part of a cross section along the A1-A1 direction shown in FIG. 3. As compared with the first embodiment shown in FIG. 7, a route of the webbing 40 is modified in the first variation. That is, in the first variation of the first embodiment, the webbing 40 located at the inner part of the airbag module 20 linearly extends from the rear end part toward the front side of the airbag module 20. Further, a slit 144 that extends in a longitudinal direction (the vehicle travel direction) is formed in the pad 16 that is positioned in the route of the webbing 40 extending linearly.

In the first variation of the first embodiment, because an inner side of the webbing 40 is disposed closer to (is disposed to contact) the inner part of the airbag module 20, the pad 16 is not interposed between the inner surface of the airbag module 20 and the webbing 40. Therefore, the webbing 40 can certainly hold the airbag module 20. Further, because the webbing 40 passes through the linear slit 144, there is an advantage that an installation work of the airbag module 20 can become easy.

Second Variation of First Embodiment

Figure 14:
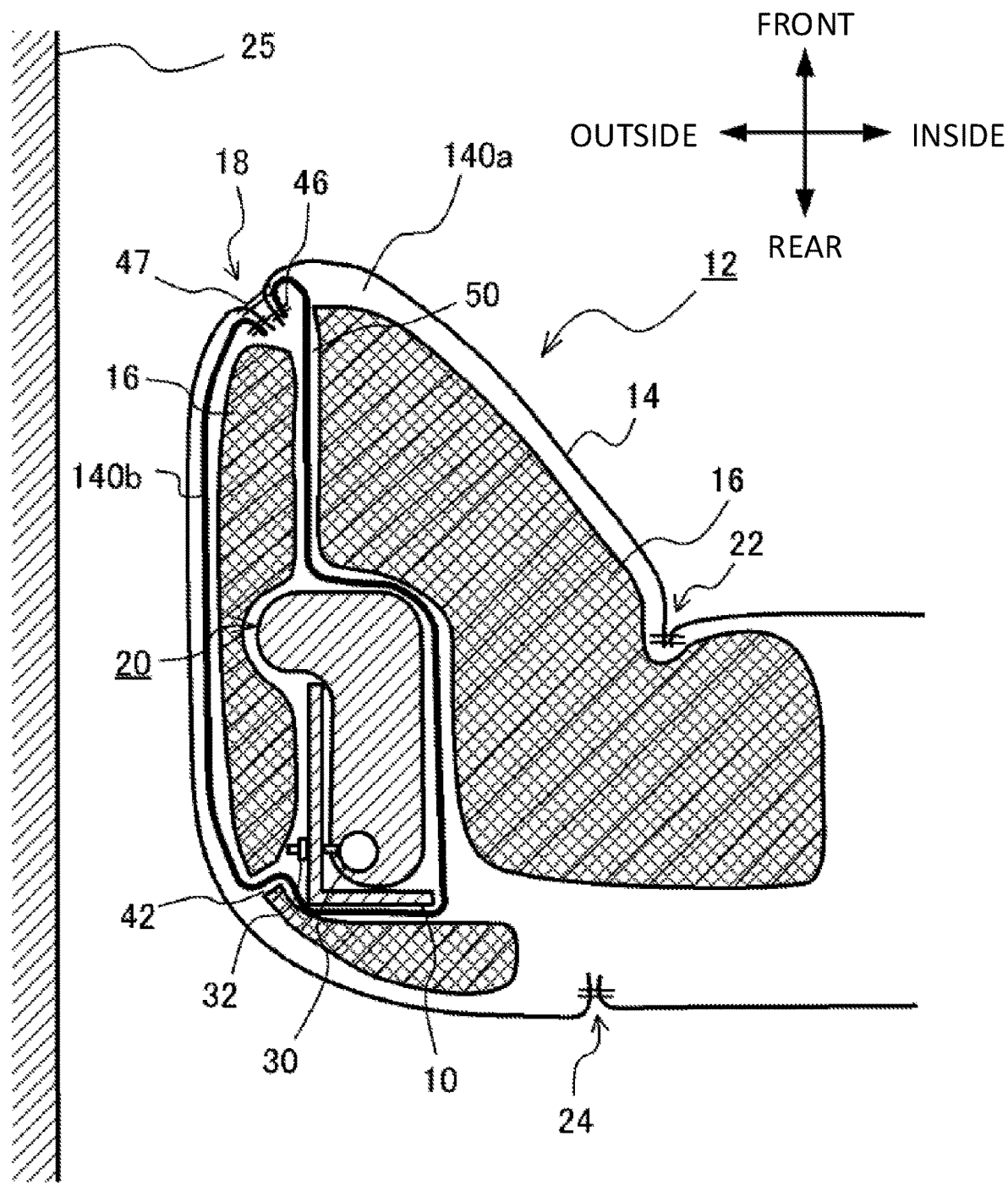
FIG. 14 is a cross-sectional view that shows a structure of the side airbag device according to a second variation of the first embodiment of the present invention.

FIG. 14 is a cross-sectional view that shows a structure of the side airbag device according to a second variation of the first embodiment of the present invention. FIG. 14 corresponds to a part of a cross section along the A1-A1 direction shown in FIG. 3. As compared with the first embodiment shown in FIG. 7, a route of the webbing 40 is modified in the second variation. That is, in the second variation of the first embodiment, the webbing 40 located at the inner part of the airbag module 20 extends from the rear end part along the side part and the front part of the airbag module 20 so as to encircle such the side part and the front part of the airbag module 20. Thereafter, the webbing 40 reaches the tip side of the side support part 12 after the webbing 40 passes through a slit 50 for the cleavage in the side support part 12.

In the second variation of the first embodiment, because an inner side of the webbing 40 is disposed closer to (is disposed to contact) the inner part of the airbag module 20, the pad 16 is not interposed between the webbing 40 and the airbag module 20 at the inner part and the front part of the airbag module 20. Therefore, the webbing 40 can certainly hold the airbag module 20. Further, the slit 50 for the cleavage is used to guide the webbing 40, it is not necessary to additionally provide a dedicated slit in the pad 16. As a result, it contributes to the simplification of the manufacturing process and the reduction of the manufacturing cost.

First Variation of Second Embodiment

Figure 15:
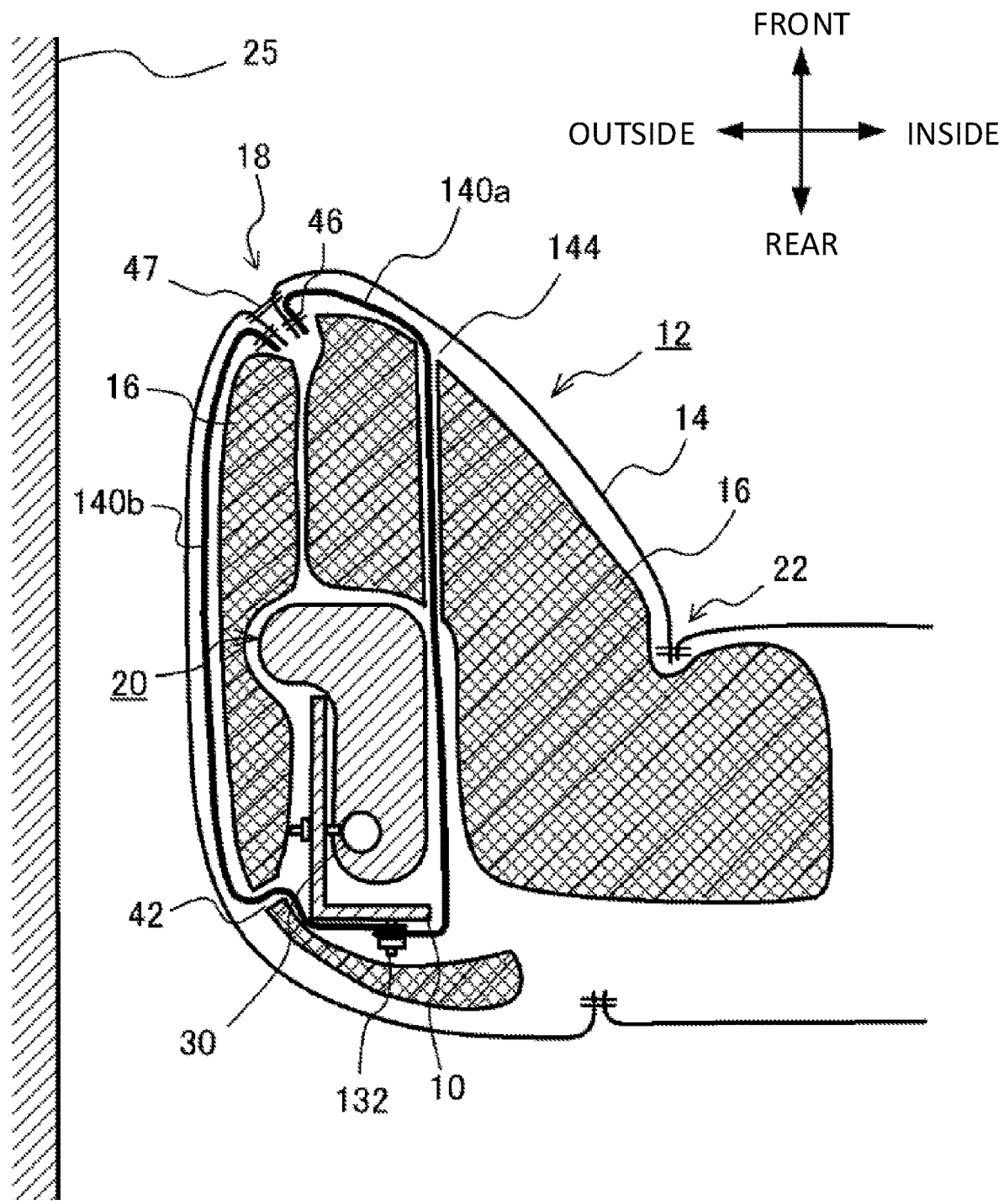
FIG. 15 is a cross-sectional view that shows a structure of the side airbag device according to a first variation of the second embodiment of the present invention.

FIG. 15 is a cross-sectional view that shows a structure of the side airbag device according to a first variation of the second embodiment of the present invention. FIG. 15 corresponds to a part of a cross section along the A1-A1 direction shown in FIG. 3. As compared with the second embodiment shown in FIG. 11, a route of the webbing 140a (one of the webbings 140a and 104b) is modified in the first variation. That is, in the first variation of the second embodiment, the webbing 140a located at the inner part the airbag module 20 linearly extends from the rear end part toward the front side of the airbag module 20. Further, the slit 144 that extends in the longitudinal direction (the vehicle travel direction) is formed in the pad 16 that is positioned in the route of the webbing 140a extending linearly.

In the first variation of the second embodiment, because an inner side of the webbing 140a is disposed closer to (is disposed to contact) the inner part of the airbag module 20, the pad 16 is not interposed between the inner surface of the airbag module 20 and the webbing 140a. Therefore, the webbing 140a can certainly hold the airbag module 20. Further, because the webbing 140a passes through the linear slit 144, there is an advantage that an installation work of the airbag module 20 can become easy.

Second Variation of Second Embodiment

Figure 16:
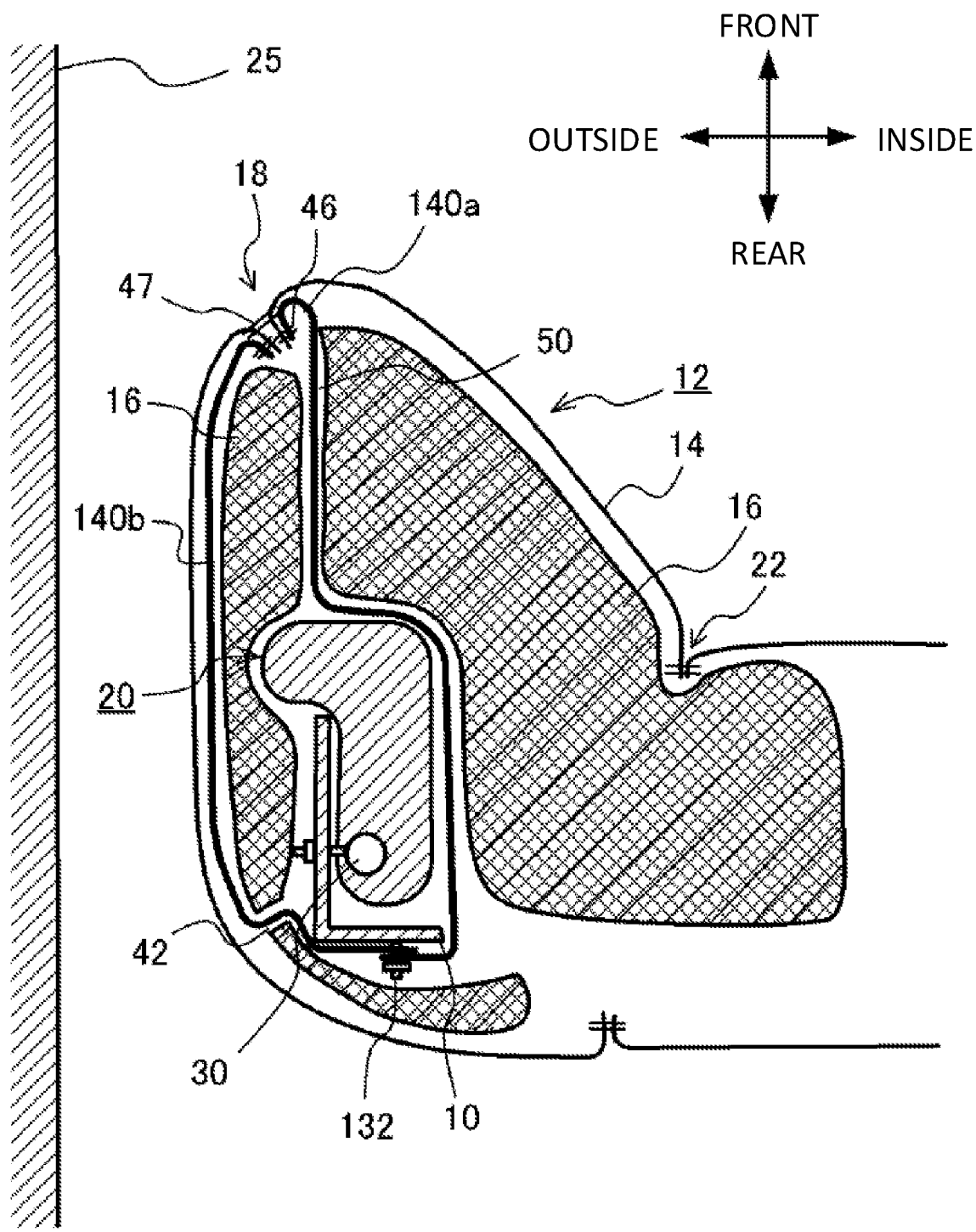
FIG. 16 is a cross-sectional view that shows a structure of the side airbag device according to a second variation of the second embodiment of the present invention.

FIG. 16 is a cross-sectional view that shows a structure of the side airbag device according to a second variation of the second embodiment of the present invention. FIG. 16 corresponds to a part of a cross section along the A1-A1 direction shown in FIG. 3. As compared with the second embodiment shown in FIG. 11, a route of the webbing 140a is modified in the second variation. That is, in the second variation of the second embodiment, the webbing 140a located at the inner part of the airbag module 20 extends from the rear end part along the side part and the front part of the airbag module 20 so as to encircle such the side part and the front part of the airbag module 20. Thereafter, the webbing 140a reaches the tip side of the side support part 12 after the webbing 140a passes through the slit 50 for the cleavage in the side support part 12.

In the second variation of the second embodiment, because an inner side of the webbing 140a is disposed closer to (is disposed to contact) the inner part of the airbag module 20, the pad 16 is not interposed between the webbing 140a and the airbag module 20 at the inner part and the front part of the airbag module 20. Therefore, the webbing 140a can certainly hold the airbag module 20. Further, the slit 50 for the cleavage is used to guide the webbing 140a, it is not necessary to additionally provide a dedicated slit in the pad 16. As a result, it contributes to the simplification of the manufacturing process and the reduction of the manufacturing cost.

First Variation of Third Embodiment

Figure 17:
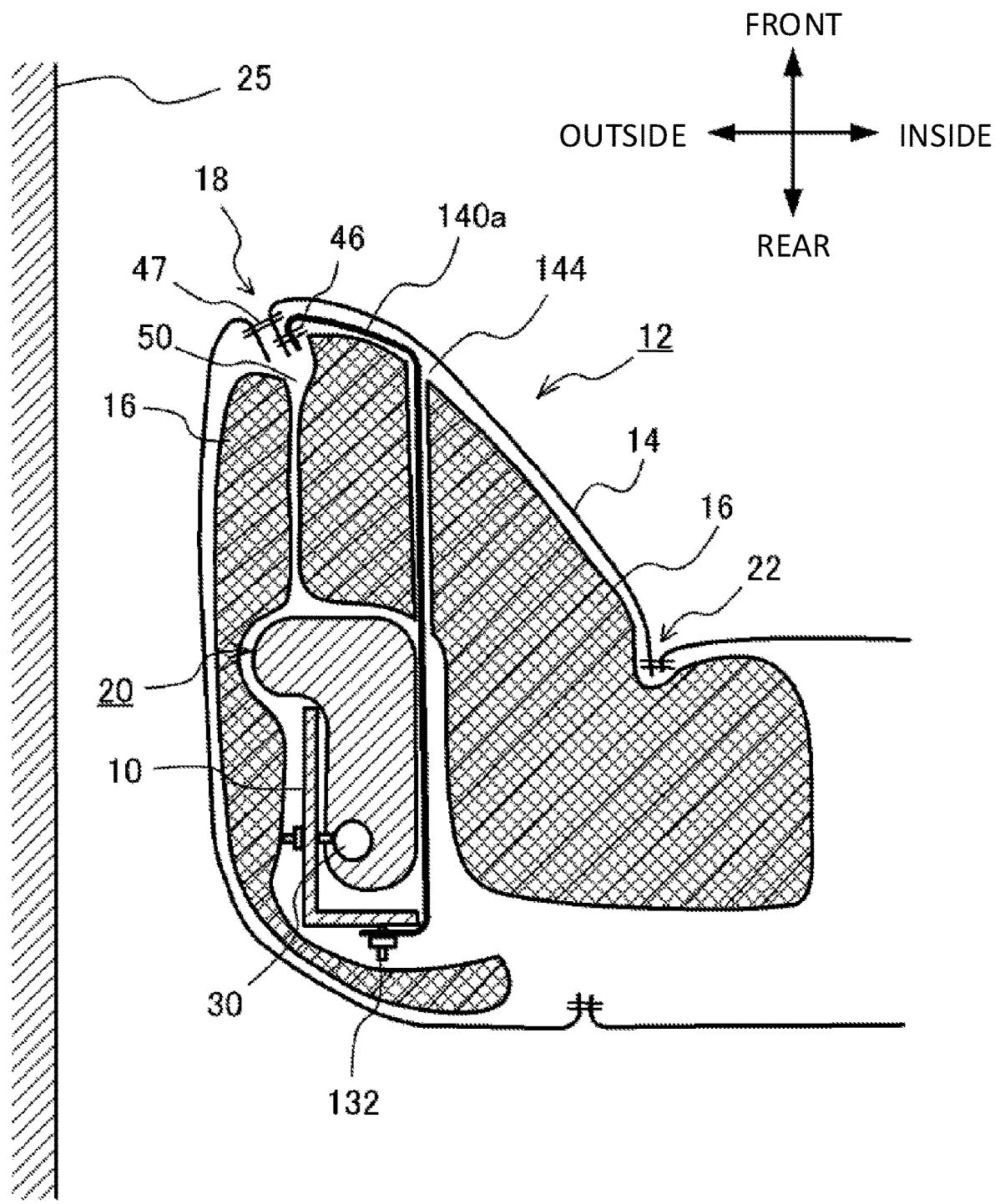
FIG. 17 is a cross-sectional view that shows a structure of the side airbag device according to a first variation of the third embodiment of the present invention.

FIG. 17 is a cross-sectional view that shows a structure of the side airbag device according to a first variation of the third embodiment of the present invention. FIG. 17 corresponds to a part of a cross section along the A1-A1 direction shown in FIG. 3. As compared with the third embodiment shown in FIG. 12, a route of the webbing 140a is modified in the first variation. That is, in the first variation of the third embodiment, the webbing 140a located at the inner part the airbag module 20 linearly extends from the rear end part toward the front side of the airbag module 20. Further, the slit 144 that extends in the longitudinal direction (the vehicle travel direction) is formed in the pad 16 that is positioned in the route of the webbing 140a extending linearly.

In the first variation of the third embodiment, because an inner side of the webbing 140a is disposed closer to (is disposed to contact) the inner part of the airbag module 20, the pad 16 is not interposed between the inner surface of the airbag module 20 and the webbing 140a. Therefore, the webbing 140a can certainly hold the airbag module 20. Further, because the webbing 140a passes through the linear slit 144, there is an advantage that an installation work of the airbag module 20 can become easy.

Second Variation of Third Embodiment

Figure 18:
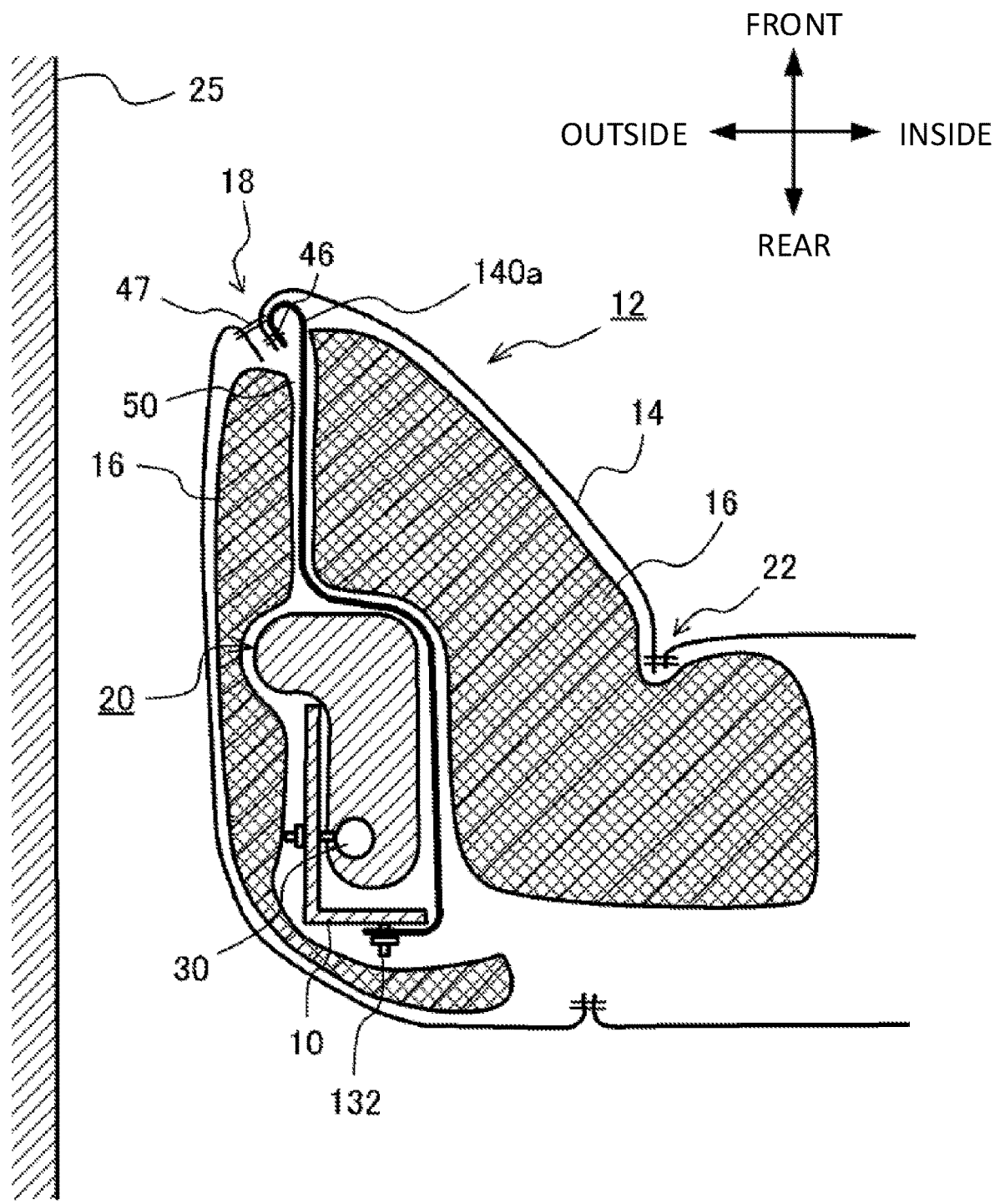
FIG. 18 is a cross-sectional view that shows a structure of the side airbag device according to a second variation of the third embodiment of the present invention.

FIG. 18 is a cross-sectional view that shows a structure of the side airbag device according to a second variation of the third embodiment of the present invention. FIG. 18 corresponds to a part of a cross section along the A1-A1 direction shown in FIG. 3. As compared with the third embodiment shown in FIG. 12, a route of the webbing 140a is modified in the second variation. That is, in the second variation of the third embodiment, the webbing 140a located at the inner part of the airbag module 20 extends from the rear end part along the side part and the front part of the airbag module 20 so as to encircle such the side part and the front part of the airbag module 20. Thereafter, the webbing 140a reaches the tip side of the side support part 12 after the webbing 140a passes through the slit 50 for the cleavage in the side support part 12.

In the second variation of the third embodiment, because an inner side of the webbing 140a is disposed closer to (is disposed to contact) the inner part of the airbag module 20, the pad 16 is not interposed between the webbing 140a and the airbag module 20 at the inner part and the front part of the airbag module 20. Therefore, the webbing 140a can certainly hold the airbag module 20. Further, the slit 50 for the cleavage is used to guide the webbing 140a, it is not necessary to additionally provide a dedicated slit in the pad 16. As a result, it contributes to the simplification of the manufacturing process and the reduction of the manufacturing cost.

Fourth Embodiment

Figure 19:
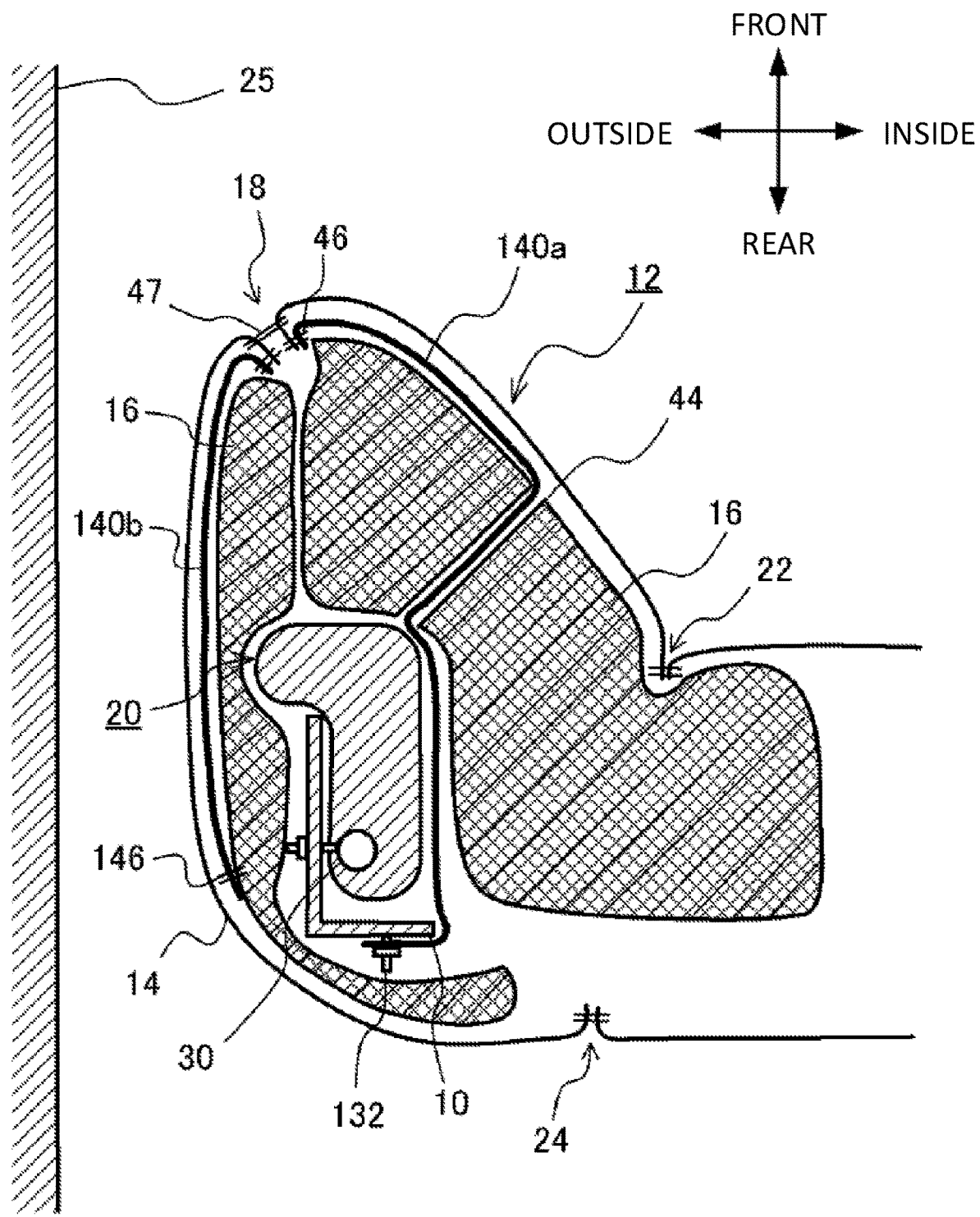
FIG. 19 is a cross-sectional view that shows a structure of the side airbag device according to a fourth embodiment of the present invention.

FIG. 19 is a cross-sectional view that shows a structure of the side airbag device according to a fourth embodiment of the present invention. FIG. 19 corresponds to a part of a cross section along the A1-A1 direction shown in FIG. 3. Further, because the fourth embodiment is basically different from the first, second, and third embodiments explained above only with respect to a configuration relating to the webbing, only different features will be explained below. When the fourth embodiment is compared with the other embodiments, a main different feature of the fourth embodiment is that a rear end of the webbing 140b, which is located at the outer side of the airbag module 20, of the two webbings 140a and 140b is connected to the pad 16.

First, in the same manner as the second embodiment, in the present embodiment, one round of the webbing 140 is formed by the two band-shaped cloths (webbings) 140a and 140b. The webbing 140a that is disposed at an inner side (the occupant side) has a fixed end that is fixed to the side frame 10 by a bolt 132 proximately at a rear end part of the airbag module 20. The webbing 140a extends from the fixed end part along the inner surface of the airbag module 20, passes through the pad 16 via the slit 44, and reaches the external side of the side support part 12. Further, the webbing 140a further extends along the outer surface of the side support part 12 and reaches proximately the front edge part of the side support part 12.

On the other hand, the webbing 140b that is disposed at an outer side (a side of a door trim 25) extends along the outer surface of the side support part 12 proximately from the front edge part of the side support part 12, and passes through the pad 16 via the slit 42 extending in a direction from the outside toward the inside, and reaches the rear end part of the airbag module 20. Thereafter, a rear end of the webbing 140b is connected and fixed to the pad 16 by sewing 146 (or by an adhesion). Further, the position of the sewing 146 is not particularly limited, however, when the sewing 146 is located closer to the rear side of the side support part 12, the webbing 140b can become more easily follow the deformation of the pad 16.

The front ends of the webbings 140a and 140b are connected to the edges of the seat cover 14 by the sewing 46 inside the seam 18 of the seat cover 14 that is located at the tip side of the side support part 12. Further, the edges of the seat cover 14 are connected by the sewing 47 that is able to be broken. Thus, such the edges connected by the sewing 47 are to be the starting point of the cleavage (tearing and opening) when the airbag (34 and 36) is deployed.

First Variation of Fourth Embodiment

Figure 20:
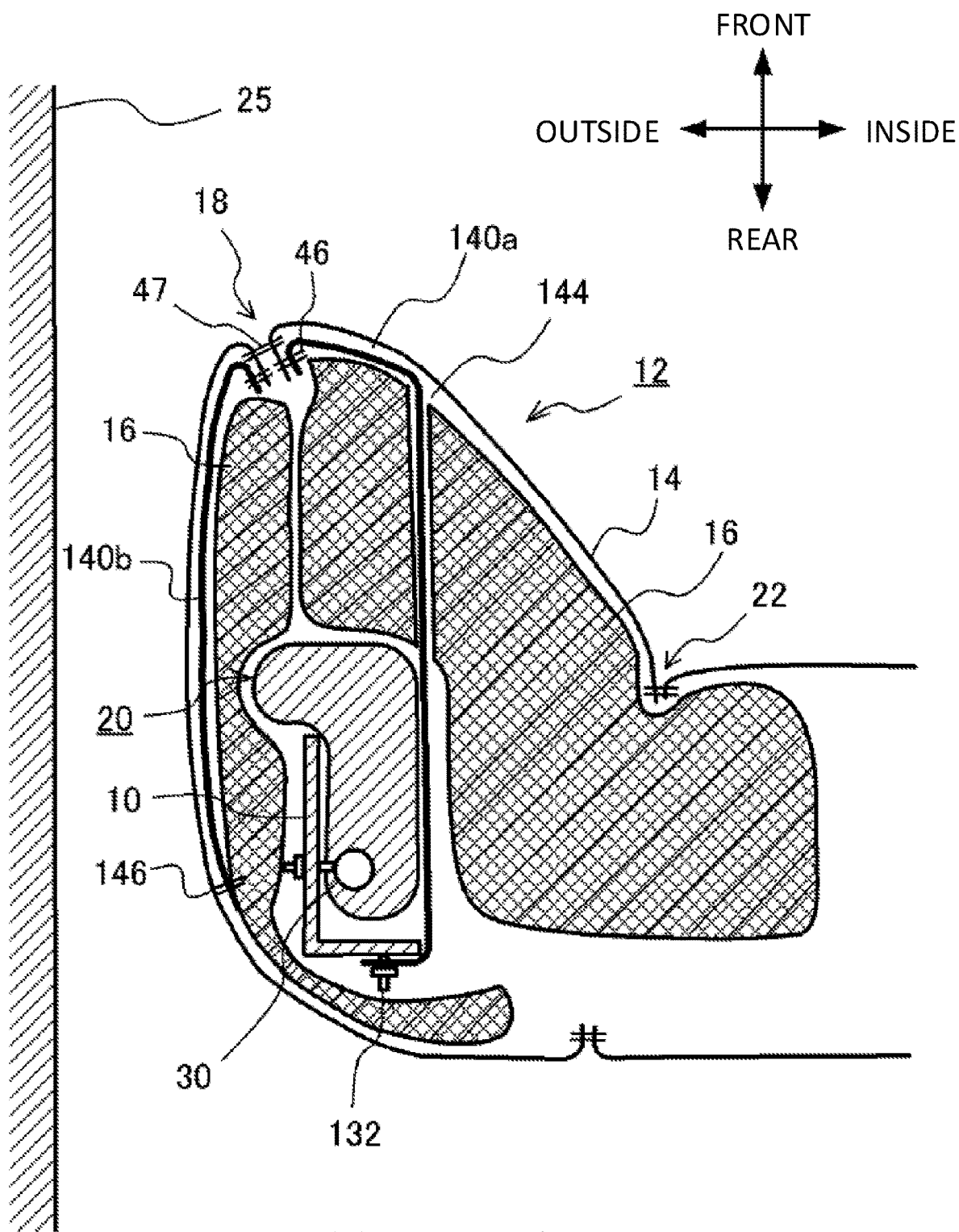
FIG. 20 is a cross-sectional view that shows a structure of the side airbag device according to a first variation of the fourth embodiment of the present invention.

FIG. 20 is a cross-sectional view that shows a structure of the side airbag device according to a first variation of the fourth embodiment of the present invention. FIG. 20 corresponds to a part of a cross section along the A1-A1 direction shown in FIG. 3. As compared with the fourth embodiment shown in FIG. 19, a route of the webbing 140a (one of the webbings 140a and 104b) is modified in the first variation. That is, in the first variation of the fourth embodiment, the webbing 140a located at the inner part the airbag module 20 linearly extends from the rear end part toward the front side of the airbag module 20. Further, the slit 144 that extends in the longitudinal direction (the vehicle travel direction) is formed in the pad 16 that is positioned in the route of the webbing 140a extending linearly.

In the first variation of the fourth embodiment, because an inner side of the webbing 140a is disposed closer to (is disposed to contact) the inner part of the airbag module 20, the pad 16 is not interposed between the inner surface of the airbag module 20 and the webbing 140a. Therefore, the webbing 140a can certainly hold the airbag module 20. Further, because the webbing 140a passes through the linear slit 144, there is an advantage that an installation work of the airbag module 20 can become easy.

Second Variation of Fourth Embodiment

Figure 21:
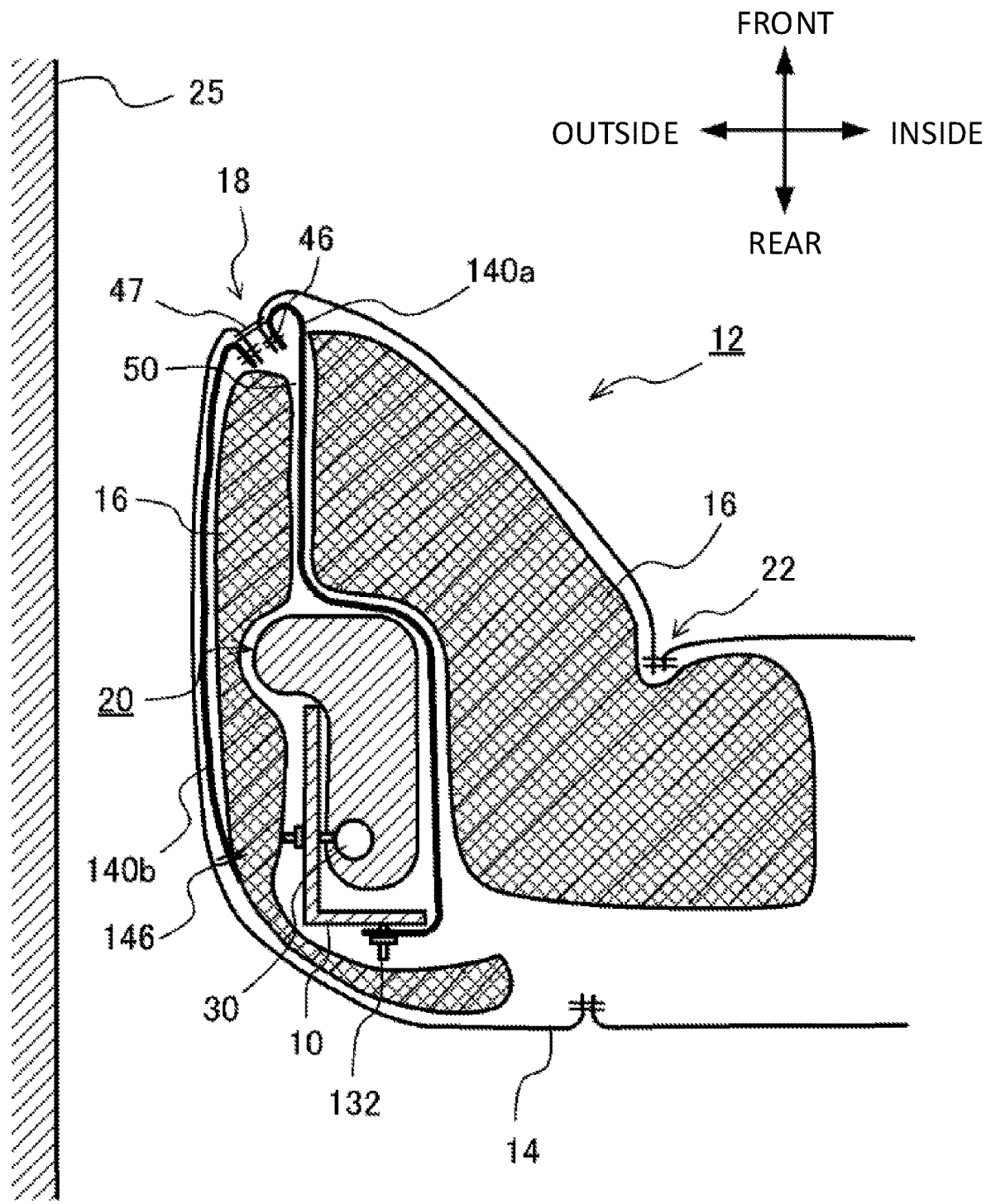
FIG. 21 is a cross-sectional view that shows a structure of the side airbag device according to a second variation of the fourth embodiment of the present invention.

FIG. 21 is a cross-sectional view that shows a structure of the side airbag device according to a second variation of the fourth embodiment of the present invention. FIG. 21 corresponds to a part of a cross section along the A1-A1 direction shown in FIG. 3. As compared with the fourth embodiment shown in FIG. 19, a route of the webbing 140a is modified in the second variation. That is, in the second variation of the fourth embodiment, the webbing 140a located at the inner part of the airbag module 20 extends from the rear end part along the side part and the front part of the airbag module 20 so as to encircle such the side part and the front part of the airbag module 20. Thereafter, the webbing 140a reaches the tip side of the side support part 12 after the webbing 140a passes through the slit 50 for the cleavage in the side support part 12.

In the second variation of the fourth embodiment, because an inner side of the webbing 140a is disposed closer to (is disposed to contact) the inner part of the airbag module 20, the pad 16 is not interposed between the webbing 140a and the airbag module 20 at the inner part and the front part of the airbag module 20. Therefore, the webbing 140a can certainly hold the airbag module 20. Further, the slit 50 for the cleavage is used to guide the webbing 140a, it is not necessary to additionally provide a dedicated slit in the pad 16. As a result, it contributes to the simplification of the manufacturing process and the reduction of the manufacturing cost.

Fifth Embodiment

Figure 22:
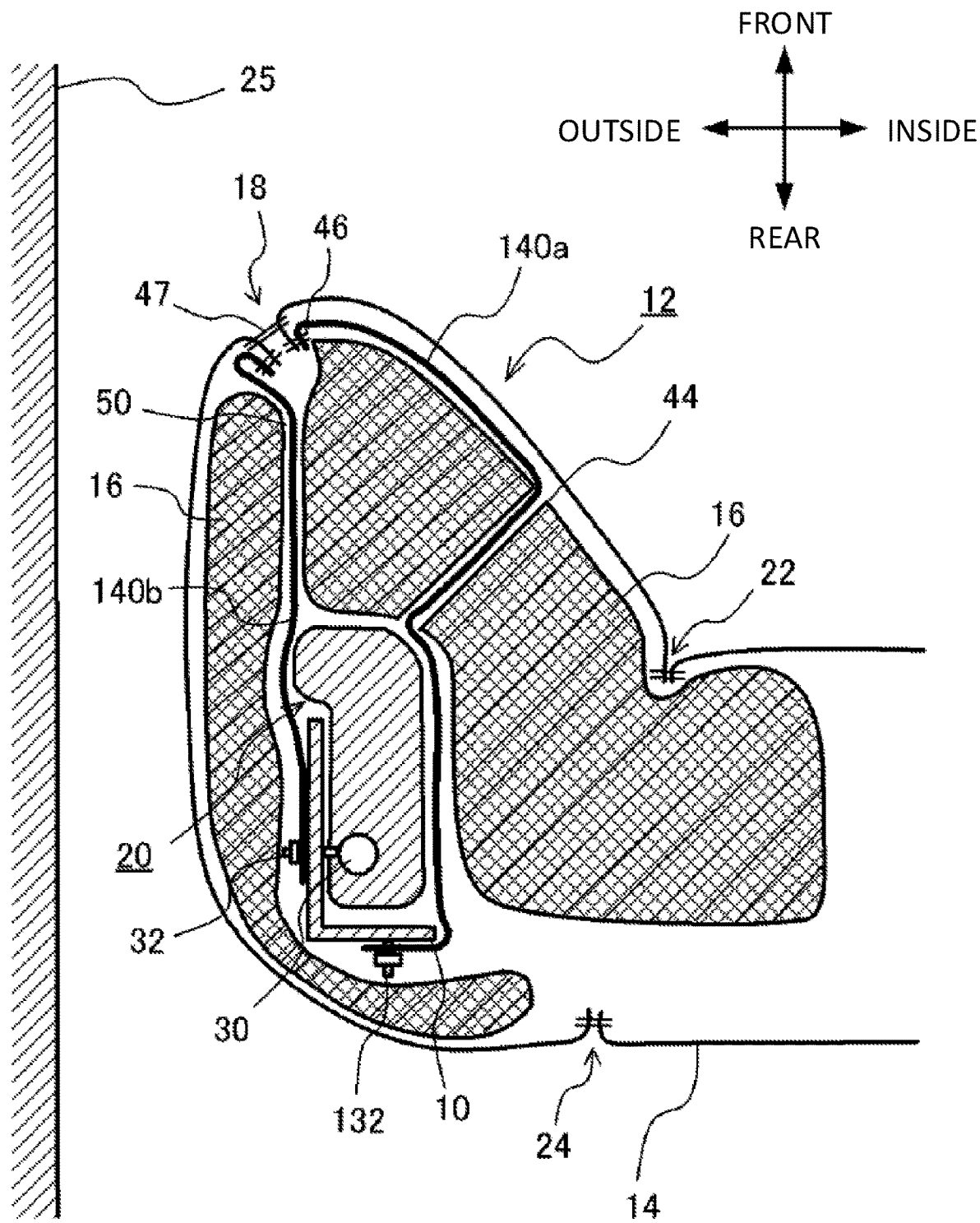
FIG. 22 is a cross-sectional view that shows a structure of the side airbag device according to a fifth embodiment of the present invention.

FIG. 22 is a cross-sectional view that shows a structure of the side airbag device according to a fifth embodiment of the present invention. FIG. 22 corresponds to a part of a cross section along the A1-A1 direction shown in FIG. 3. Further, because the fifth embodiment is basically different from the first, second, third, and fourth embodiments explained above only with respect to a configuration relating to the webbing, only different features will be explained below. When the fifth embodiment is compared with the other embodiments, a main different feature of the fifth embodiment is that the outer webbing 140b of the two webbings 140a and 140b is disposed at the inner side the pad 16 in the vehicle width direction.

First, in the same manner as the second and third embodiments, in the present embodiment, one round of the webbing 140 is formed by the two band-shaped cloths (webbings) 140a and 140b. The webbing 140a that is disposed at an inner side (the occupant side) has a fixed end that is fixed to the side frame 10 by a bolt 132 proximately at a rear end part of the airbag module 20. The webbing 140a extends from the fixed end part along the inner surface of the airbag module 20, passes through the pad 16 via the slit 44, and reaches the external side of the side support part 12. Further, the webbing 140a further extends along the outer surface of the side support part 12 and reaches proximately the front edge part of the side support part 12.

On the other hand, the webbing 140b that is disposed at an outer side (the side of the door trim 25) extends proximately from the front edge part of the side support part 12 toward the rear side (the side of the airbag module 20) by passing through the slit 50 for the cleavage. Further, the webbing 140b is fixed to the side frame 10 by the stud bolt 32 that fixes the inflator 30 to the side frame 10.

The front ends of the webbings 140a and 140b are connected to the edges of the seat cover 14 by the sewing 46 inside the seam 18 of the seat cover 14 that is located at the tip side of the side support part 12. Further, the edges of the seat cover 14 are connected by the sewing 47 that is able to be broken. Thus, such the edges connected by the sewing 47 are to be the starting point of the cleavage (tearing and opening) when the airbag (34 and 36) is deployed.

First Variation of Fifth Embodiment

Figure 23:
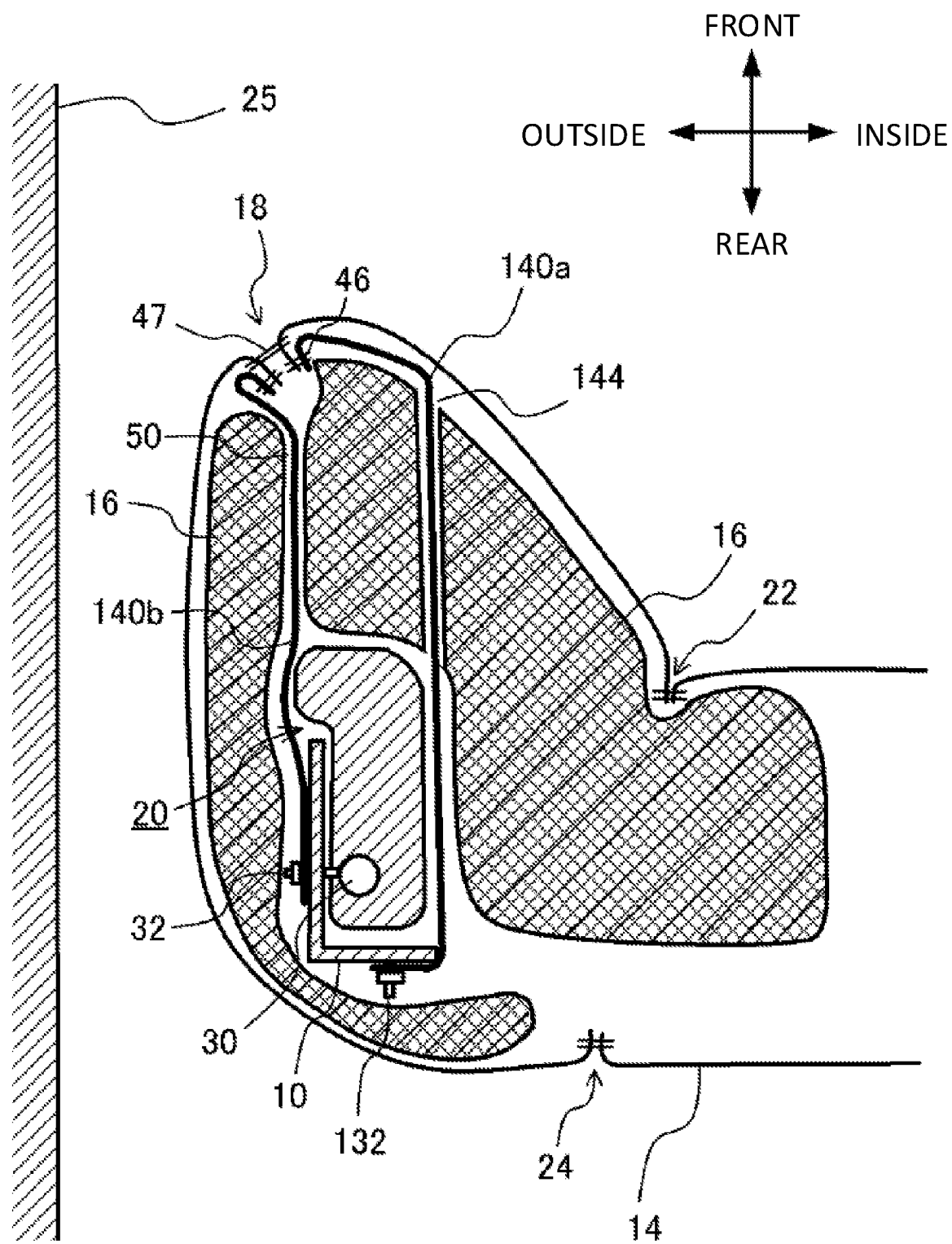
FIG. 23 is a cross-sectional view that shows a structure of the side airbag device according to a first variation of the fifth embodiment of the present invention.

FIG. 23 is a cross-sectional view that shows a structure of the side airbag device according to a first variation of the fifth embodiment of the present invention. FIG. 23 corresponds to a part of a cross section along the A1-A1 direction shown in FIG. 3. As compared with the fifth embodiment shown in FIG. 22, a route of the webbing 140a (one of the webbings 140a and 104b) is modified in the first variation. That is, in the first variation of the fifth embodiment, the webbing 140a located at the inner part the airbag module 20 linearly extends from the rear end part toward the front side of the airbag module 20. Further, the slit 144 that extends in the longitudinal direction (the vehicle travel direction) is formed in the pad 16 that is positioned in the route of the webbing 140a extending linearly.

In the first variation of the fifth embodiment, because an inner side of the webbing 140a is disposed closer to (is disposed to contact) the inner part of the airbag module 20, the pad 16 is not interposed between the inner surface of the airbag module 20 and the webbing 140a. Therefore, the webbing 140a can certainly hold the airbag module 20. Further, because the webbing 140a passes through the linear slit 144, there is an advantage that an installation work of the airbag module 20 can become easy.

Second Variation of Fifth Embodiment

Figure 24:
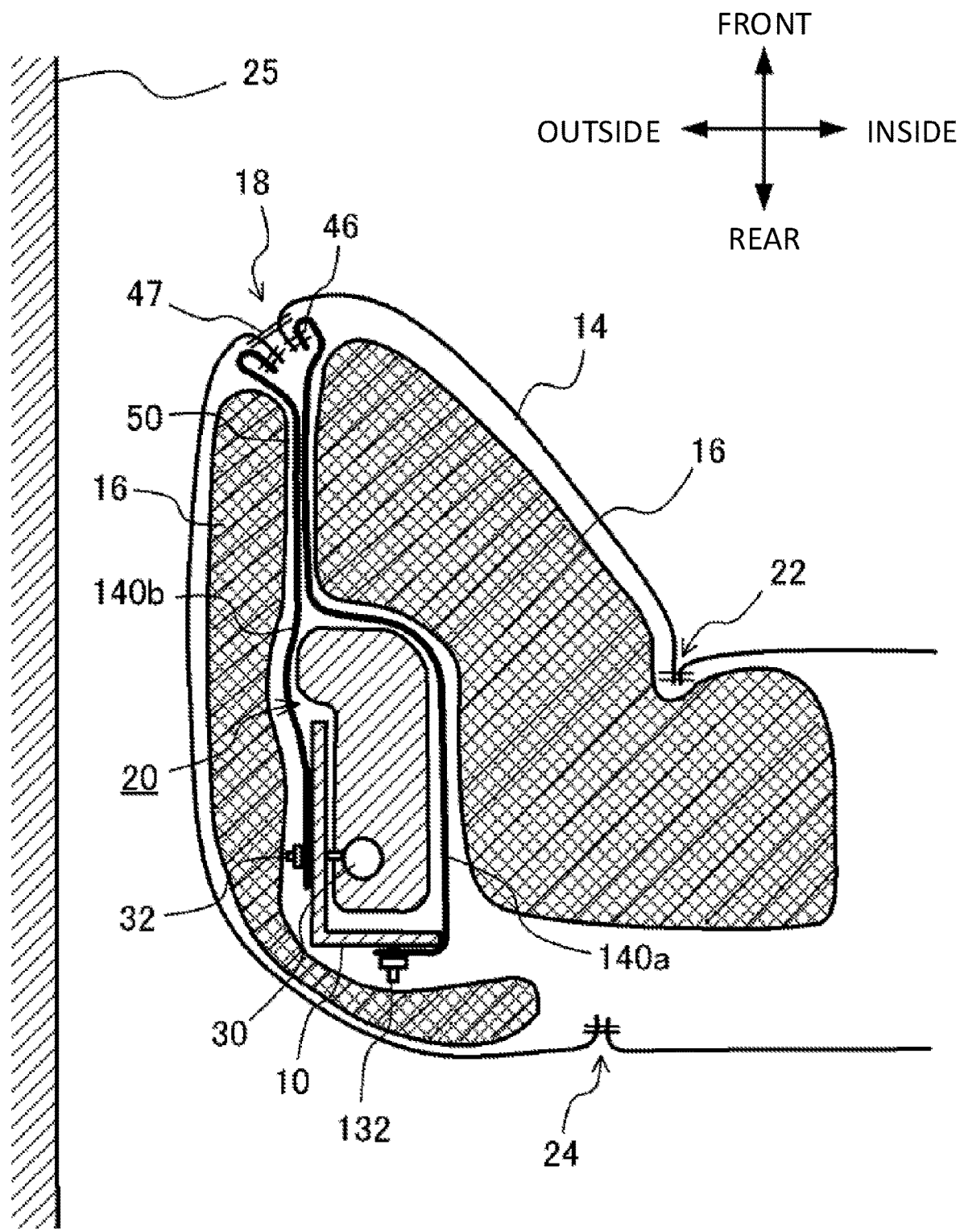
FIG. 24 is a cross-sectional view that shows a structure of the side airbag device according to a second variation of the fifth embodiment of the present invention.

FIG. 24 is a cross-sectional view that shows a structure of the side airbag device according to a second variation of the fifth embodiment of the present invention. FIG. 24 corresponds to a part of a cross section along the A1-A1 direction shown in FIG. 3. As compared with the fifth embodiment shown in FIG. 22, a route of the webbing 140a is modified in the second variation. That is, in the second variation of the fifth embodiment, the webbing 140a located at the inner part of the airbag module 20 extends from the rear end part along the side part and the front part of the airbag module 20 so as to encircle such the side part and the front part of the airbag module 20. Thereafter, the webbing 140a reaches the tip side of the side support part 12 after the webbing 140a passes through the slit 50 for the cleavage in the side support part 12.

In the second variation of the fifth embodiment, because an inner side of the webbing 140a is disposed closer to (is disposed to contact) the inner part of the airbag module 20, the pad 16 is not interposed between the webbing 140a and the airbag module 20 at the inner part and the front part of the airbag module 20. Therefore, the webbing 140a can certainly hold the airbag module 20. Further, the slit 50 for the cleavage is used to guide the webbings 140a and 140b, it is not necessary to additionally provide a dedicated slit in the pad 16. As a result, it contributes to the simplification of the manufacturing process and the reduction of the manufacturing cost.

Third Variation of Fifth Embodiment

Figure 25:
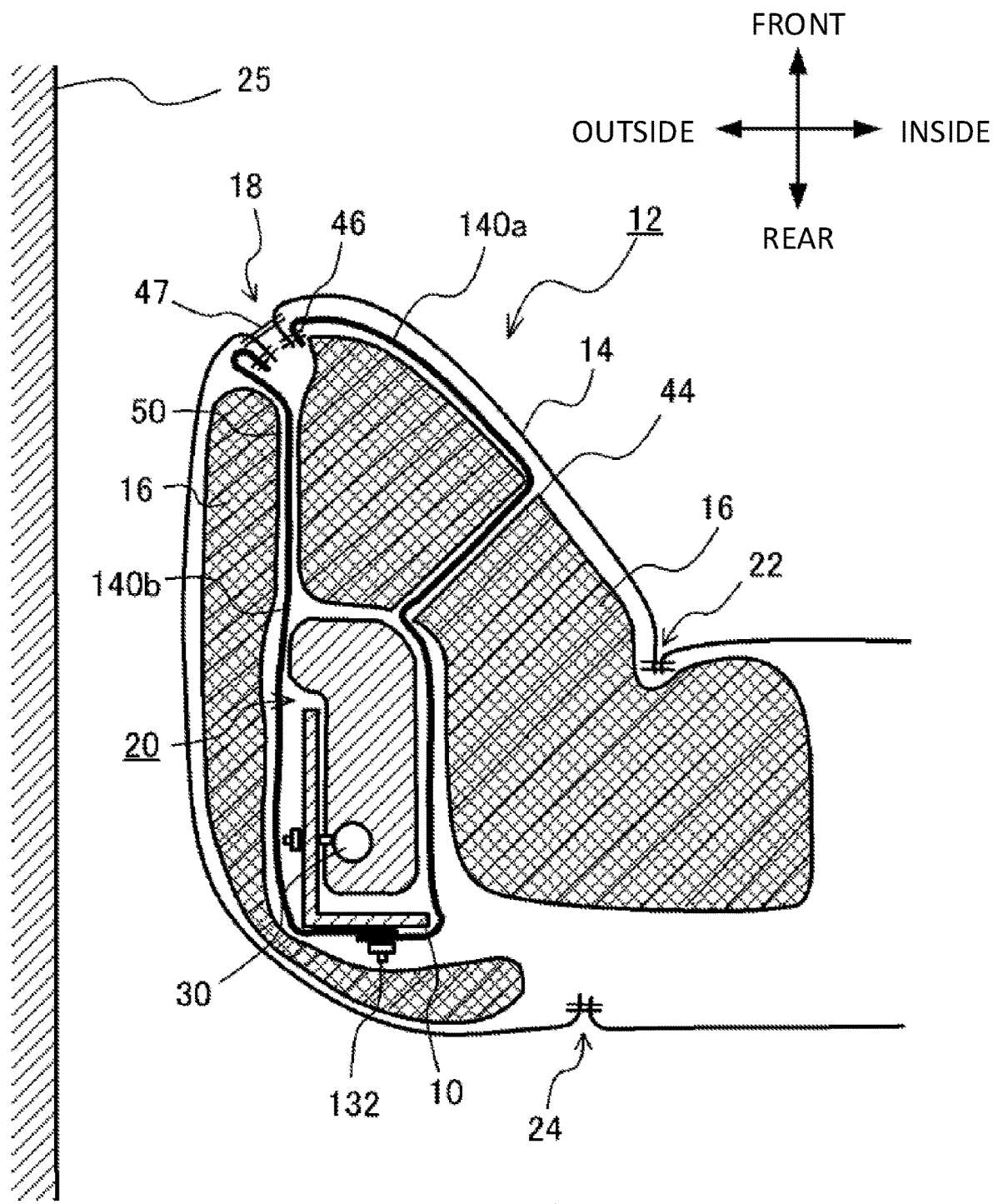
FIG. 25 is a cross-sectional view that shows a structure of the side airbag device according to a third variation of the fifth embodiment of the present invention.

FIG. 25 is a cross-sectional view that shows a structure of the side airbag device according to a third variation of the fifth embodiment of the present invention. FIG. 25 corresponds to a part of a cross section along the A1-A1 direction shown in FIG. 3. As compared with the fifth embodiment shown in FIG. 22, a connection configuration (position) of the rear end of the webbing 140b is modified in the third variation. That is, in the third variation of the fifth embodiment, the rear end of the webbing 140b that is disposed at an outer side of the airbag module 20 is fixed to the side frame 10 together with the webbing 140a by the bolt 132 at the rear end of the side frame 10. The webbing 140b extends from the rear end part of the airbag module 20 along the inner part of the pad 16, passes through the slit 50 for cleavage, and reaches the tip side of the side support part 12.

Fourth Variation of Fifth Embodiment

Figure 26:
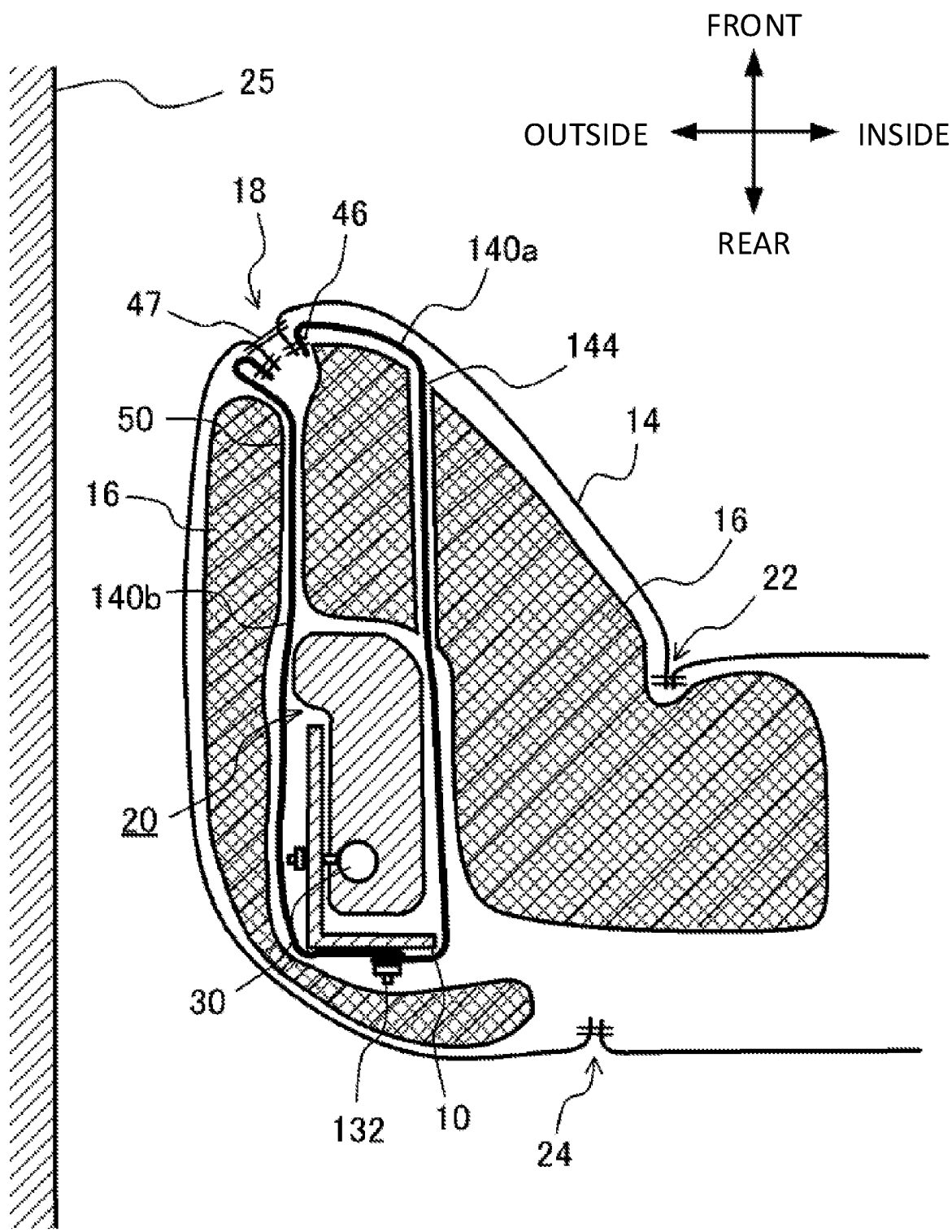
FIG. 26 is a cross-sectional view that shows a structure of the side airbag device according to a fourth variation of the fifth embodiment of the present invention.

FIG. 26 is a cross-sectional view that shows a structure of the side airbag device according to a fourth variation of the fifth embodiment of the present invention. FIG. 26 corresponds to a part of a cross section along the A1-A1 direction shown in FIG. 3. As compared with the first variation of the fifth embodiment shown in FIG. 23, a connection configuration (position) of the rear end of the webbing 140b is modified in the fourth variation. That is, in the fourth variation of the fifth embodiment, the rear end of the webbing 140b that is disposed at an outer side of the airbag module 20 is fixed to the side frame 10 together with the webbing 140a by the bolt 132 at the rear end of the side frame 10. The webbing 140b extends from the rear end part of the airbag module 20 along the inner part of the pad 16, passes through the slit 50 for cleavage, and reaches the tip side of the side support part 12.

Fifth Variation of Fifth Embodiment

Figure 27:
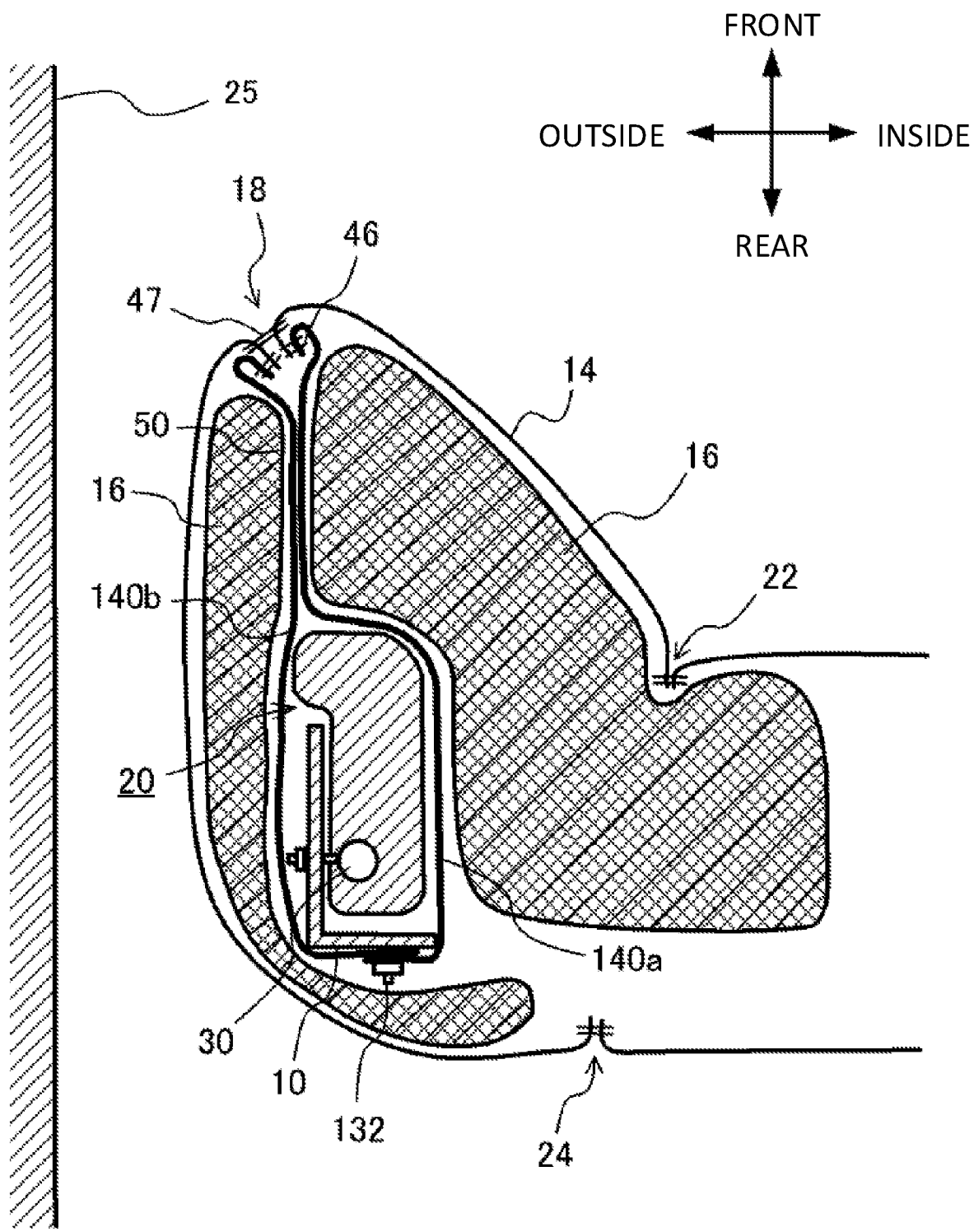
FIG. 27 is a cross-sectional view that shows a structure of the side airbag device according to a fifth variation of the fifth embodiment of the present invention.

FIG. 27 is a cross-sectional view that shows a structure of the side airbag device according to a fifth variation of the fifth embodiment of the present invention. FIG. 27 corresponds to a part of a cross section along the A1-A1 direction shown in FIG. 3. As compared with the second variation of the fifth embodiment shown in FIG. 24, a connection configuration (position) of the rear end of the webbing 140b is modified in the fifth variation. That is, in the fifth variation of the fifth embodiment, the rear end of the webbing 140b that is disposed at an outer side of the airbag module 20 is fixed to the side frame 10 together with the webbing 140a by the bolt 132 at the rear end of the side frame 10. The webbing 140b extends from the rear end part of the airbag module 20 along the inner part of the pad 16, passes through the slit 50 for cleavage, and reaches the tip side of the side support part 12.

Sixth Variation of Fifth Embodiment

Figure 28:
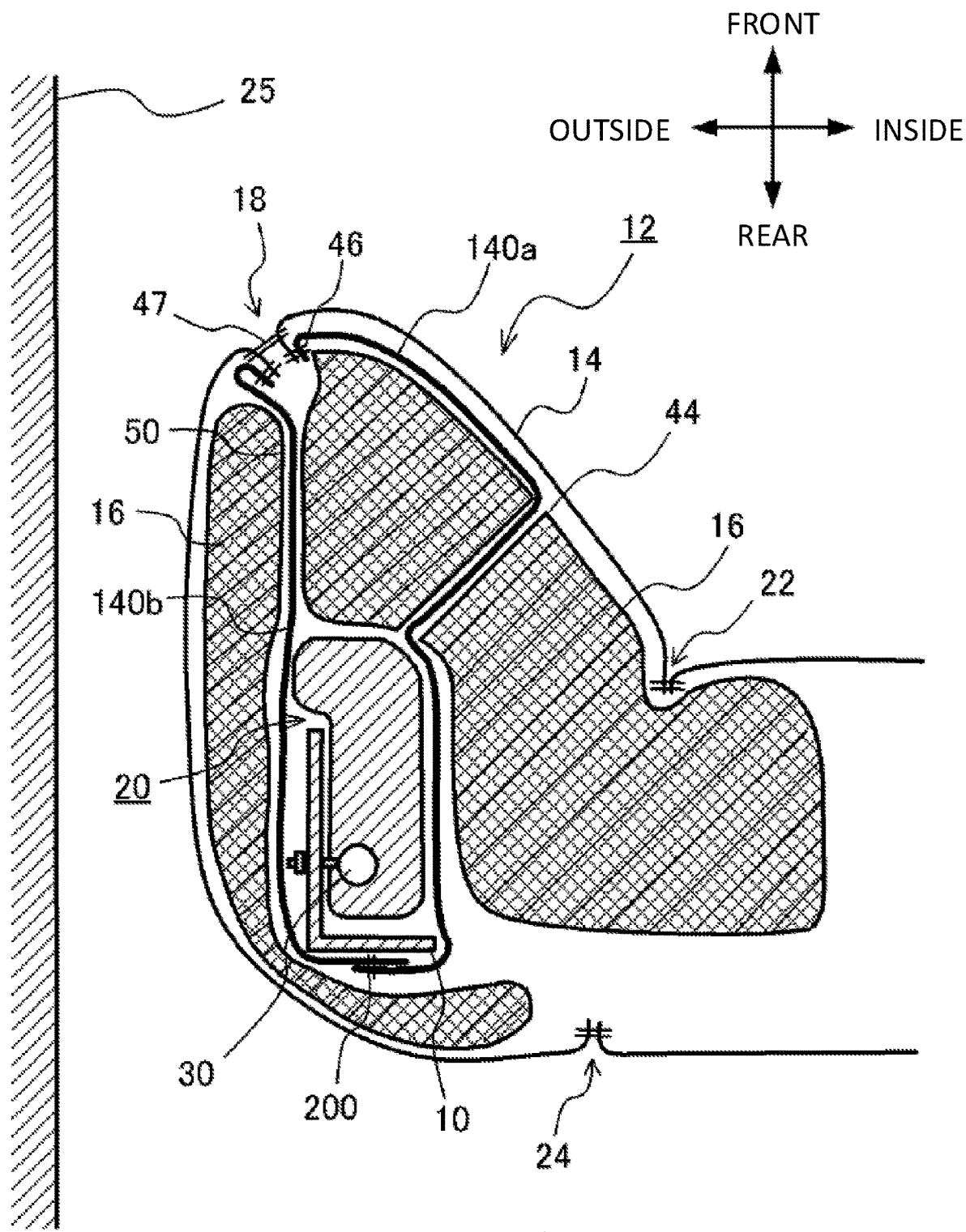
FIG. 28 is a cross-sectional view that shows a structure of the side airbag device according to a sixth variation of the fifth embodiment of the present invention.

FIG. 28 is a cross-sectional view that shows a structure of the side airbag device according to a sixth variation of the fifth embodiment of the present invention. FIG. 28 corresponds to a part of a cross section along the A1-A1 direction shown in FIG. 3. As compared with the third variation of the fifth embodiment shown in FIG. 25, the connection method of the rear ends of the webbings 140a and 140b are modified in the sixth variation. That is, in the sixth variation of the fifth embodiment, the rear end of the webbing 140b that is disposed at the outer side of the airbag module 20 and the rear end of the webbing 140a that is disposed at the inner side of the airbag module 20 are connected to each other by sewing 200 at the rear end of the side frame 10. Further, the rear ends of the webbings 140a and 140b can also be connected to each other by adhesion, gluing, or bonding instead of the sewing 200.

Seventh Variation of Fifth Embodiment

Figure 29:
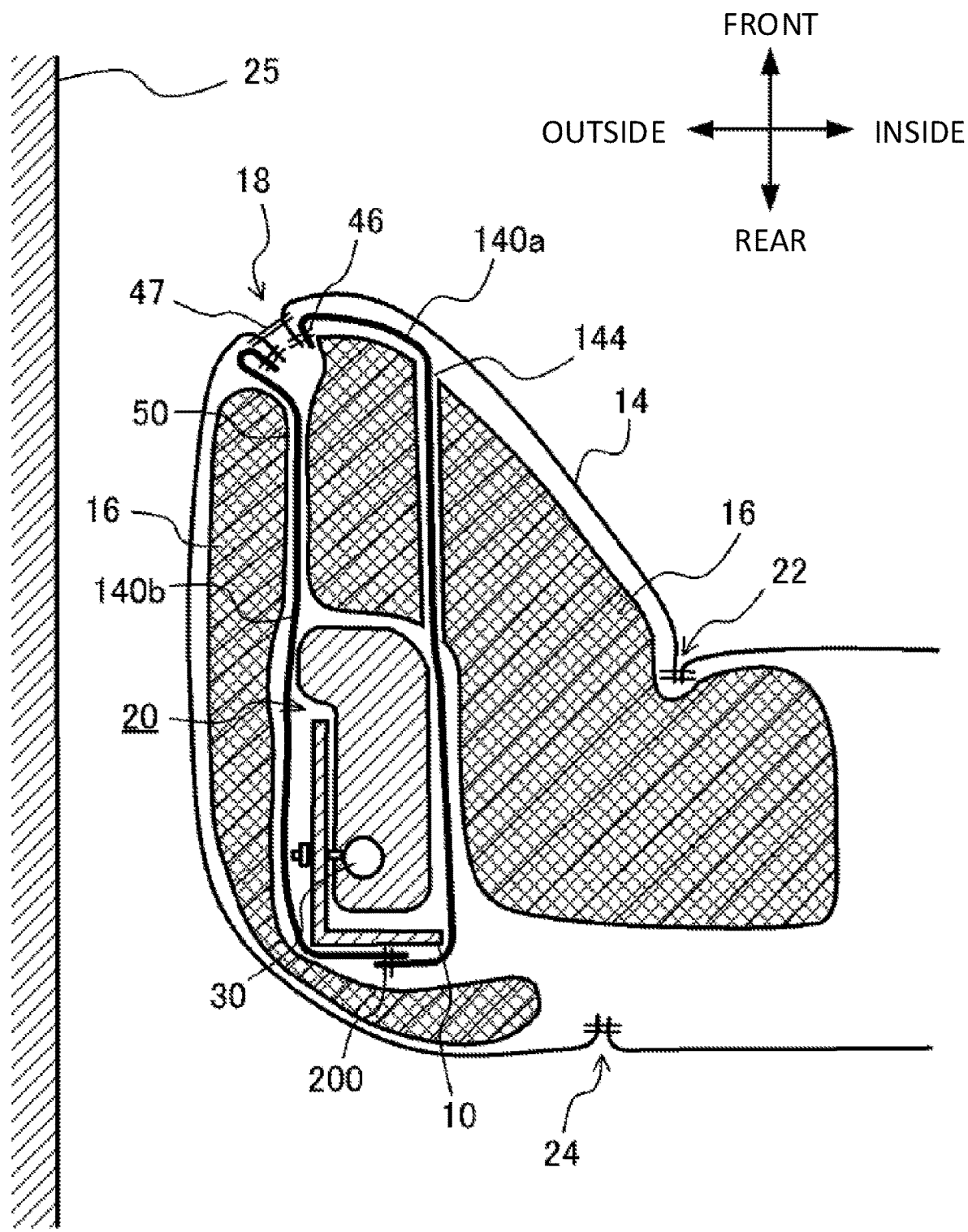
FIG. 29 is a cross-sectional view that shows a structure of the side airbag device according to a seventh variation of the fifth embodiment of the present invention.

FIG. 29 is a cross-sectional view that shows a structure of the side airbag device according to a seventh variation of the fifth embodiment of the present invention. FIG. 29 corresponds to a part of a cross section along the A1-A1 direction shown in FIG. 3. As compared with the fourth variation shown in FIG. 26, the connection method of the rear ends of the webbings 140a and 140b are modified in the seventh variation. That is, in the seventh variation of the fifth embodiment, the rear end of the webbing 140b that is disposed at the outer side of the airbag module 20 and the rear end of the webbing 140a that is disposed at the inner side of the airbag module 20 are connected to each other by sewing 200 at the rear end of the side frame 10. Further, the rear ends of the webbings 140a and 140b can also be connected to each other by adhesion, gluing, or bonding instead of the sewing 200.

Eighth Variation of Fifth Embodiment

Figure 30:
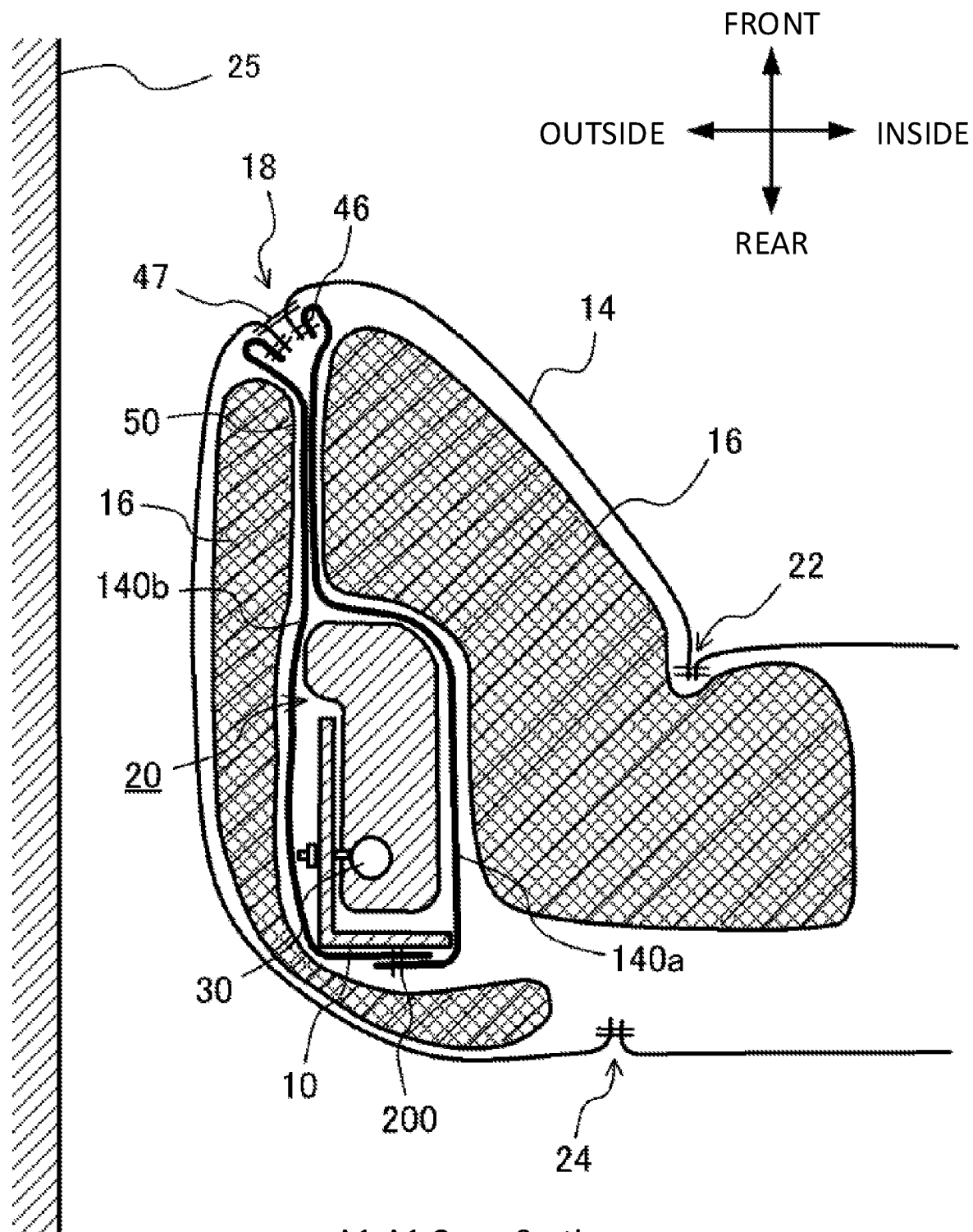
FIG. 30 is a cross-sectional view that shows a structure of the side airbag device according to an eighth variation of the fifth embodiment of the present invention.

FIG. 30 is a cross-sectional view that shows a structure of the side airbag device according to an eighth variation of the fifth embodiment of the present invention. FIG. 30 corresponds to a part of a cross section along the A1-A1 direction shown in FIG. 3. As compared with the fifth variation shown in FIG. 27, the connection method of the rear ends of the webbings 140a and 140b are modified in the eighth variation. That is, in the eighth variation of the fifth embodiment, the rear end of the webbing 140b that is disposed at the outer side of the airbag module 20 and the rear end of the webbing 140a that is disposed at the inner side of the airbag module 20 are connected to each other by sewing 200 at the rear end of the side frame 10. Further, the rear ends of the webbings 140a and 140b can also be connected to each other by adhesion, gluing, or bonding instead of the sewing 200.

The side airbag device being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

For instance, in the exemplary embodiments discussed above, the side airbag device located at a near side (of a seat surface of a vehicle seat that is close to a vehicle door when observed from an outer side in a vehicle width direction) is intensively explained. However, it will be apparent for one of ordinary skill in the art that the same or similar configurations explained in the embodiments can be used for such as a side airbag located at a far side (a seat surface on a further side of a vehicle seat from a vehicle door in a vehicle width direction), and a single-seat vehicle of such as a very small vehicle (a small mobility etc.) (a vehicle including the part that has only one seat in a row with or without a door).

What is claimed is:

1. A vehicle seat comprising:
   a side support;
   a side frame disposed in the side support and extending along a vehicle travel direction;
   a pad disposed in the side support;
   an airbag module stored in the side support, the airbag module having:
      an airbag for restraining an occupant when the airbag is expanded and deployed; and
      an inflator for supplying an inflation gas to the airbag; and
   a webbing partially covering the airbag module when the airbag module is stored,
   the webbing extending from a rear side of the airbag module in the vehicle travel direction along an inner side surface of the airbag module, passing through the pad of the side support along a first path to a front edge of the side support in the vehicle travel direction, the first path disposed at a cleavage part of the pad at which the pad is opened when the airbag is deployed,
   wherein the webbing is disposed to extend proximately from the front edge of the side support along an outer surface of the pad that is opposite to an occupant seating side of the side support in a vehicle width direction, pass through the pad along a second path that is formed from the outer surface of the pad toward an inside of the side support, and reach the rear side of the airbag module in the vehicle travel direction.

2. The vehicle seat according to claim 1, wherein the first path is disposed to linearly extend from the rear side of the airbag module toward an outside of the pad.

3. The vehicle seat according to claim 1, wherein the first path and the second path are slits formed in the pad.

4. The vehicle seat according to claim 3, wherein a rear end of the webbing in the vehicle travel direction is fixed to the side frame.

5. The vehicle seat according to claim 4, wherein the rear end of the webbing is fixed to the side frame by a bolt.

6. The vehicle seat according to claim 4, wherein the side frame has a hook, and the rear end of the webbing is fixed to the side frame by hooking the rear end on the hook.

7. The vehicle seat according to claim 1, wherein the webbing is a band-shaped cloth.

8. The vehicle seat according to claim 1, wherein the webbing has a fragile part that is a starting point to cleave when the airbag is deployed.

9. The vehicle seat according to claim 8, wherein the fragile part of the webbing is a seam.

10. The vehicle seat according to claim 1, wherein the webbing is configured with first and second webbings, each of the first and second webbings is a band-shaped cloth, and the first and second webbings are disposed at upper and lower locations at the airbag module in a vertical direction.

11. The vehicle seat according to claim 1, wherein an outside of the pad of the side support and an outside of the webbing are provided with a seat cover.

12. A vehicle seat comprising:
   a side support;
   a side frame disposed in the side support and extending along a vehicle travel direction;
   a pad disposed in the side support, the pad including a first slit defining a cleavage part of the pad, an airbag module stored in the side support, the airbag module having:
      an airbag for restraining an occupant when the airbag is expanded and deployed; and
      an inflator for supplying an inflation gas to the airbag; and
   a webbing partially covering the airbag module when the airbag module is stored, the webbing extending from a rear side of the airbag module toward a vehicle front side between an inner side surface of the pad and the airbag module, passing through a second slit in the pad to reach an outside of the pad, and further extending along an outer surface of the pad and reaching proximately a front edge of the side support in the vehicle travel direction, the first slit spaced from the second slit,
   wherein the cleavage part of the pad opens when the airbag is deployed.

13. The vehicle seat according to claim 12, wherein:
   the airbag has a first chamber and a second chamber, the first chamber is configured to be deployed toward a front side of the side support in the vehicle travel direction, and the second chamber accommodates the inflator therein and is configured to be deployed at an occupant seating side with respect to the first chamber in a vehicle width direction, and the airbag has an inner vent hole at a partition between the first and second chambers, and the inflation gas flows from the second chamber to the first chamber through the inner vent hole.

14. The vehicle seat according to claim 12, wherein the second slit extends from adjacent a forward side of the airbag to the outside of the pad.

15. A vehicle seat comprising:
a side support;
a side frame disposed in the side support and extending along a vehicle travel direction;
a pad disposed in the side support;
an airbag module stored in the side support, the airbag module having:
    an airbag for restraining an occupant when the airbag is expanded and deployed; and
    an inflator for supplying an inflation gas to the airbag; and
a webbing partially covering the airbag module when the airbag module is stored,
the webbing extending from a rear side of the airbag module in the vehicle travel direction along an inner side surface of the airbag module, passing through the pad of the side support along a first path to a front edge of the side support in the vehicle travel direction, the first path disposed at a cleavage part of the pad at which the pad is opened when the airbag is deployed, wherein the webbing is disposed to extend proximately from the front edge of the side support along an outer surface of the pad that is opposite to an occupant seating side of the side support in a vehicle width direction and connect with an outer side of the pad.

16. A vehicle seat comprising:
a side support;
a side frame disposed in the side support and extending along a vehicle travel direction;
a pad disposed in the side support;
an airbag module stored in the side support, the airbag module having:
    an airbag for restraining an occupant when the airbag is expanded and deployed; and
    an inflator for supplying an inflation gas to the airbag; and
a webbing partially covering the airbag module when the airbag module is stored,
the webbing extending from a rear side of the airbag module in the vehicle travel direction along an inner side surface of the airbag module, passing through the pad of the side support along a first path to a front edge of the side support in the vehicle travel direction, the first path disposed at a cleavage part of the pad at which the pad is opened when the airbag is deployed,
wherein the airbag includes a first chamber and a second chamber, the second chamber disposed to be deployed to overlap with a frame sidewall when viewed in a vehicle width direction, and
wherein the first chamber is disposed to be deployed to non-overlap with the frame sidewall when viewed in the vehicle width direction.

17. The vehicle seat according to claim 1, wherein the airbag module extends on an extension line of a frame sidewall when the airbag module is stored, and the extension line extends toward a vehicle front side from a front side of the frame sidewall.

* * * * *